US006459914B1

(12) United States Patent
Gustafsson et al.

(10) Patent No.: US 6,459,914 B1
(45) Date of Patent: *Oct. 1, 2002

(54) SIGNAL NOISE REDUCTION BY SPECTRAL SUBTRACTION USING SPECTRUM DEPENDENT EXPONENTIAL GAIN FUNCTION AVERAGING

(75) Inventors: Harald Gustafsson, Lund; Ingvar Claesson, Dalby; Sven Nordholm, Kallinge, all of (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,503

(22) Filed: May 27, 1998

(51) Int. Cl.[7] .................... N04B 1/38; H04M 1/00

(52) U.S. Cl. .................... 455/570; 455/63; 455/67.1; 455/114; 455/296; 375/346; 381/94.1; 704/226

(58) Field of Search .................... 455/63, 570, 114, 455/296, 67.3, 303; 381/94, 94.3; 704/226, 227, 228

(56) References Cited

U.S. PATENT DOCUMENTS

| | | | | | |
|---|---|---|---|---|---|
| 4,628,529 | A | * | 12/1986 | Borth et al. | 381/94.3 |
| 4,630,304 | A | * | 12/1986 | Borth et al. | 381/94.3 |
| 4,630,305 | A | * | 12/1986 | Borth et al. | 381/94.3 |
| 4,703,507 | A | * | 10/1987 | Holden | 381/94.5 |
| 4,737,976 | A | * | 4/1988 | Borth et al. | 455/563 |
| 4,811,404 | A | * | 3/1989 | Vilmur et al. | 381/94.3 |
| 4,852,175 | A | * | 7/1989 | Kates | 381/317 |
| 5,012,519 | A | * | 4/1991 | Adlersberg et al. | 704/206 |
| 5,408,532 | A | * | 4/1995 | Yokota et al. | 381/71.9 |
| 5,432,859 | A | * | 7/1995 | Yang et al. | 381/94.3 |
| 5,544,250 | A | * | 8/1996 | Urbanski | 381/94.3 |
| 5,602,962 | A | * | 2/1997 | Kellerman | 704/226 |
| 5,687,243 | A | * | 11/1997 | McLaughlin et al. | 381/94.3 |
| 5,740,256 | A | * | 4/1998 | Da Dosta et al. | 381/94.7 |
| 5,757,937 | A | * | 5/1998 | Itoh et al. | 381/94.3 |
| 5,893,056 | A | * | 4/1999 | Saikaly et al. | 704/226 |
| 5,903,853 | A | * | 5/1999 | Sano | 455/570 |
| 5,995,567 | A | * | 11/1999 | Cioffi et al. | 375/346 |
| 6,070,137 | A | * | 5/2000 | Bloebaum et al. | 704/227 |
| 6,157,670 | A | * | 12/2000 | Kosanovic | 375/227 |
| 6,175,602 | B1 | * | 1/2001 | Gustafsson et al. | 375/346 |

OTHER PUBLICATIONS

"Comparative Performance of Spectral Subtraction and HMM–Based Speech Enhancement Strategies With Application to Hearing Aid Design," H. Sheikhzadeh et al., Proceedings of the ICASSP, Speech Processing 1. Adelaide, Apr. 19–22, 1994, vol. 1, Apr. 1994, pp. 1–13 —1–16, IEEE, para. 3.

(List continued on next page.)

*Primary Examiner*—Tracy Legree
*Assistant Examiner*—Temica M. Davis
(74) *Attorney, Agent, or Firm*—Burns, Doane, Swecker & Mathis, L.L.P.

(57) ABSTRACT

Methods and apparatus for providing speech enhancement in noise reduction systems include spectral subtraction algorithms using linear convolution, causal filtering and/or spectrum dependent exponential averaging of the spectral subtraction gain function. According to exemplary embodiments, successive blocks of a spectral subtraction gain function are averaged based on a discrepancy between an estimate of a spectral density of a noisy speech signal and an averaged estimate of a spectral density of a noise component of the noisy speech signal. The successive gain function blocks are averaged, for example, using controlled exponential averaging. Control is provided, for example, by making a memory of the exponential averaging inversely proportional to the discrepancy. Alternatively, the averaging memory can be made to increase in direct proportion with decreases in the discrepancy, while exponentially decaying with increases in the discrepancy to prevent audible voice shadows.

21 Claims, 15 Drawing Sheets

OTHER PUBLICATIONS

"New Methods for Adaptive Noise Suppression," L. Arslan et al. Proceedings of the ICASSP, Detroit, May 9–12, 1995, Speech, vol. 1, May 9, 1995, pp. 812–815, IEEE, paragraph 2.2.

"Suppression of Acoustic Noise in Speech Using Spectral Substraction," S.F. Boll, IEEE Trans. Acoust. Speech and Sig. Proc., 27:113–120, 1979.

"Speech Enhancement Based on Masking Properties of the Auditory System" N. Virage, IEEE ICASSP, Proc. 796–799, vol. 1, 1995.

"Speech Enhancement Using Psychoacoustic Criteria," D. Tsoukalas, M. Paraskevas and J. Mourjopoulos, IEEE ICASSP Proc., 359–362 vol. 2, 1993.

"Speech Enhancement by Spectral Magnitude Estimate —A Unifying Approach," F. Xie and D. Van Compernolle, IEEE Speech Communication, 89–104 vol. 19, 1996.

"Spectral Subtraction Based on Minimum Statistics," R. Martin, UESIPCO, Proc., 1182–1185 vol. 2, 1994.

"A Spectral Subtraction Method for the Enhancement of Speech Corrupted by Non–White, Non–Stationary Noise," S. McOlash, R. Niederjohn and J. Heinen, IEEE IECON. Proc., 872–877 vol. 2, 1995.

"Digital Signal Processing; Principles, Algorithms and Applications," J. Proakis and D. Manolakis, Macmillan, Second Ed., 1992.

"Discrete–time Signal Processing," A. Oppenheim and R. Schafer, Prentice–Hall, Inter. Ed., 1989.

European Digital Cellular Telecommunications Systems (Phase 2); Voice Activity Detection (VAD) (GSM 06.32), European Telecommunications Standards Institute, 1994.

* cited by examiner

SIGNAL NOISE REDUCTION BY SPECTRAL SUBTRACTION USING SPECTRUM DEPENDENT EXPONENTIAL GAIN FUNCTION AVERAGING

FIELD OF THE INVENTION

The present invention relates to communications systems, and more particularly, to methods and apparatus for mitigating the effects of disruptive background noise components in communications signals.

BACKGROUND OF THE INVENTION

Today, the use of hands-free equipment in mobile telephones and other communications devices is increasing. A well known problem associated with hands-free solutions, particularly in automobile applications, is that of disruptive background noise being picked up at a hands-free microphone and transmitted to a far-end user. In other words, since the distance between a hands-free microphone and a near-end user can be relatively large, the hands-free microphone picks up not only the near-end user's speech, but also any noise which happens to be present at the near-end location. For example, in an automobile telephone application, the near-end microphone typically picks up surrounding traffic, road and passenger compartment noise. The resulting noisy near-end speech can be annoying or even intolerable for the far-end user. It is thus desirable that the background noise be reduced as much as possible, preferably early in the near-end signal processing chain (e.g., before the received near-end microphone signal is input to a near-end speech coder).

As a result, many hands-free systems include a noise reduction processor designed to eliminate background noise at the input of a near-end signal processing chain. FIG. 1 is a high-level block diagram of such a hands-free system 100. In FIG. 1, a noise reduction processor 110 is positioned at the output of a hands-free microphone 120 and at the input of a near-end signal processing path (not shown). In operation, the noise reduction processor 110 receives a noisy speech signal x from the microphone 120 and processes the noisy speech signal x to provide a cleaner, noise-reduced speech signal $s_{NR}$ which is passed through the near-end signal processing chain and ultimately to the far-end user.

One well known method for implementing the noise reduction processor 110 of FIG. 1 is referred to in the art as spectral subtraction. See, for example, S. F. Boll, Suppression of Acoustic Noise in Speech using Spectral Subtraction, *IEEE Trans. Acoust. Speech and Sig. Proc.,* 27:113–120, 1979, which is incorporated herein by reference. Generally, spectral subtraction uses estimates of the noise spectrum and the noisy speech spectrum to form a signal-to-noise (SNR) based gain function which is multiplied with the input spectrum to suppress frequencies having a low SNR. Though spectral subtraction does provide significant noise reduction, it suffers from several well known disadvantages. For example, the spectral subtraction output signal typically contains artifacts known in the art as musical tones. Further, discontinuities between processed signal blocks often lead to diminished speech quality from the far-end user perspective.

Many enhancements to the basic spectral subtraction method have been developed in recent years. See, for example, N. Virage, Speech Enhancement Based on Masking Properties of the Auditory System, *IEEE ICASSP. Proc.* 796–799 vol. 1, 1995; D. Tsoukalas, M. Paraskevas and J. Mourjopoulos, Speech Enhancement using Psychoacoustic Criteria, *IEEE ICASSP. Proc.,* 359–362 vol. 2, 1993; F. Xie and D. Van Compernolle, Speech Enhancement by Spectral Magnitude Estimation—A Unifying Approach, *IEEE Speech Communication,* 89–104 vol. 19, 1996; R. Martin, Spectral Subtraction Based on Minimum Statistics, *UESIPCO, Proc.,* 1182–1185 vol. 2, 1994; and S. M. Mc Olash, R. J. Niederjohn and J. A. Heinen, A Spectral Subtraction Method for Enhancement of Speech Corrupted by Nonwhite, Nonstationary Noise, *IEEE IECON. Proc.,* 872–877 vol. 2, 1995.

While these methods do provide varying degrees of speech enhancement, it would nonetheless be advantageous if alternative techniques for addressing the above described spectral subtraction problems relating to musical tones and inter-block discontinuities could be developed. Consequently, there is a need for improved methods and apparatus for performing noise reduction by spectral subtraction.

SUMMARY OF THE INVENTION

The present invention fulfills the above-described and other needs by providing improved methods and apparatus for performing noise reduction by spectral subtraction. According to exemplary embodiments, spectral subtraction is carried out using linear convolution, causal filtering and/or spectrum dependent exponential averaging of the spectral subtraction gain function. Advantageously, systems constructed in accordance with the invention provide significantly improved speech quality as compared to prior art systems without introducing undue complexity.

According to the invention, low order spectrum estimates are developed which have less frequency resolution and reduced variance as compared to spectrum estimates in conventional spectral subtraction systems. The spectra according to the invention are used to form a gain function having a desired low variance which in turn reduces the musical tones in the spectral subtraction output signal. According to exemplary embodiments, the gain function is further smoothed across blocks by using input spectrum dependent exponential averaging. The low resolution gain function is interpolated to the full block length gain function, but nonetheless corresponds to a filter of the low order length. Advantageously, the low order of the gain function permits a phase to be added during the interpolation. The gain function phase, which according to exemplary embodiments can be either linear phase or minimum phase, causes the gain filter to be causal and prevents discontinuities between blocks. In exemplary embodiments, the casual filter is multiplied with the input signal spectra and the blocks are fitted using an overlap and add technique. Further, the frame length is made as small as possible in order to minimize introduced delay without introducing undue variations in the spectrum estimate.

In one exemplary embodiment, a noise reduction system includes a spectral subtraction processor configured to filter a noisy input signal to provide a noise reduced output signal, wherein a gain function of the spectral subtraction processor is computed based on an estimate of a spectral density of the input signal and on an averaged estimate of a spectral density of a noise component of the input signal, and wherein successive blocks of samples of the gain function are averaged. For example, successive blocks of the spectral subtraction gain function can be averaged based on a discrepancy between the estimate of the spectral density of the input signal and the averaged estimate of the spectral density of the noise component of the input signal.

According to exemplary embodiments, the successive gain function blocks are averaged, using controlled exponential averaging. Control is provided, for example, by making a memory of the exponential averaging inversely proportional to the discrepancy. Alternatively, the averaging memory can be made to increase in direct proportion with decreases in the discrepancy, while exponentially decaying with increases in the discrepancy to prevent audible shadow voices.

An exemplary method according to the invention includes the steps of computing an estimate of a spectral density of an input signal and an averaged estimate of a spectral density of a noise component of the input signal, and using spectral subtraction to compute the noise reduced output signal based on the noisy input signal. According to the exemplary method, successive blocks of a gain function used in the step of using spectral subtraction are averaged. For example, the averaging can be based on a discrepancy between the estimate of the spectral density of the input signal and the averaged estimate of the spectral density of the noise component.

The above-described and other features and advantages of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

DETAILED DESCRIPTION OF THE INVENTION

To understand the various features and advantages of the present invention, it is useful to first consider a conventional spectral subtraction technique. Generally, spectral subtraction is built upon the assumption that the noise signal and the speech signal in a communications application are random, uncorrelated and added together to form the noisy speech signal. For example, if s(n), w(n) and x(n) are stochastic short-time stationary processes representing speech, noise and noisy speech, respectively, then:

$$x(n)=s(n)+w(n) \tag{1}$$

$$R_x(f)=R_s(f)+R_w(f) \tag{2}$$

where R(f) denotes the power spectral density of a random process.

The noise power spectral density $R_w(f)$ can be estimated during speech pauses (i.e., where x(n)=w(n)). To estimate the power spectral density of the speech, an estimate is formed as:

$$\hat{R}_s(f)=\hat{R}_x(f)-\hat{R}_w(f) \tag{3}$$

The conventional way to estimate the power spectral density is to use a periodogram. For example, if $X_N(f_u)$ is the N length Fourier transform of x(n) and $W_N(f_u)$ is the corresponding Fourier transform of w(n), then:

$$\hat{R}_x(f_u)=P_{x,N}(f_u)=\frac{1}{N}|X_N(f_u)|^2,\ f_u=\frac{u}{N},\ u=0,\ \dots,\ N-1 \tag{4}$$

$$\hat{R}_w(f_u)=P_{w,N}(f_u)=\frac{1}{N}|W_N(f_u)|^2,\ f_u=\frac{u}{N},\ u=0,\ \dots,\ N-1 \tag{5}$$

Equations (3), (4) and (5) can be combined to provide:

$$|S_N(f_u)|^2=|X_N(f_u)|^2-|W_N(f_u)|^2 \tag{6}$$

Alternatively, a more general form is given by:

$$|S_N(f_u)|^a=|X_N(f_u)|^a-|W_N(f_u)|^a \tag{7}$$

where the power spectral density is exchanged for a general form of spectral density.

Since the human ear is not sensitive to phase errors of the speech, the noisy speech phase $\phi_x(f)$ can be used as an approximation to the clean speech phase $\phi_s(f)$:

$$\phi_s(f_u)\approx\phi_x(f_u) \tag{8}$$

A general expression for estimating the clean speech Fourier transform is thus formed as:

$$S_N(f_u)=(|X_N(f_u)|^a-k\cdot|W_N(f_u)|^a)^{\frac{1}{a}}\cdot e^{j\phi_x(f_u)} \tag{9}$$

where a parameter k is introduced to control the amount of noise subtraction.

In order to simplify the notation, a vector form is introduced:

$$X_N=\begin{pmatrix} X_N(f_0) \\ X_N(f_1) \\ \vdots \\ X_N(f_{N-1}) \end{pmatrix} \tag{10}$$

The vectors are computed element by element. For clarity, element by element multiplication of vectors is denoted herein by $\odot$. Thus, equation (9) can be written employing a gain function $G_N$ and using vector notation as:

$$S_N=G_N\odot|X_N|\odot e^{j\phi_x}=G_N\odot X_N \tag{11}$$

where the gain function is given by:

$$G_N=\left(\frac{|X_N|^a-k\cdot|W_N|^a}{|X_N|^a}\right)^{\frac{1}{a}}=\left(1-k\cdot\frac{|W_N|^a}{|X_N|^a}\right)^{\frac{1}{a}} \tag{12}$$

Figure 1:
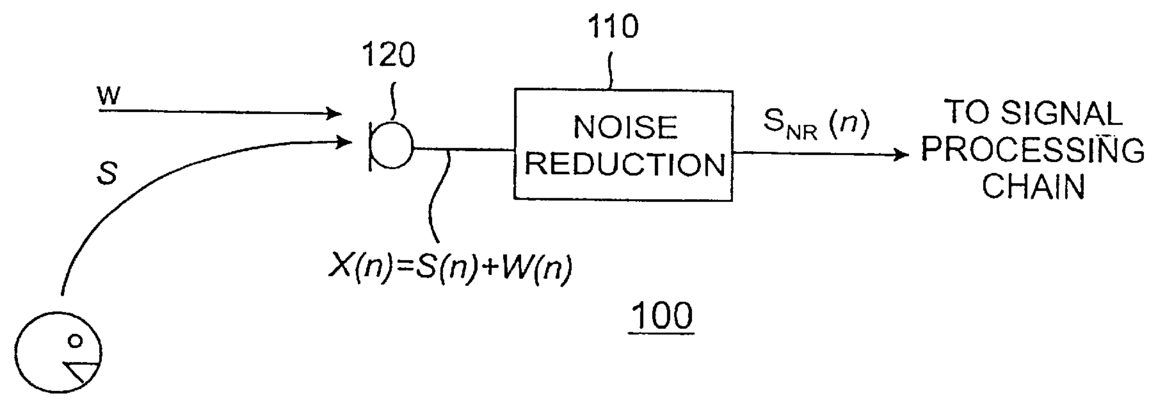
FIG. 1 is a block diagram of a noise reduction system in which the teachings of the present invention can be implemented.
Figure 2:
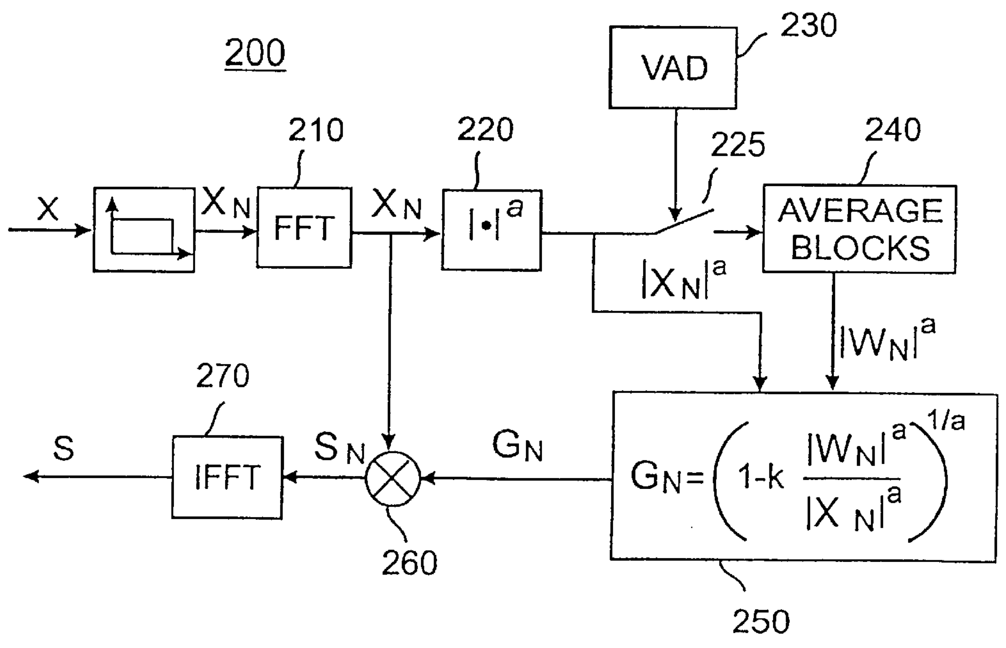
FIG. 2 depicts a conventional spectral subtraction noise reduction processor.

Equation (12) represents the conventional spectral subtraction algorithm and is illustrated in FIG. 2. In FIG. 2, a conventional spectral subtraction noise reduction processor 200 includes a fast Fourier transform processor 210, a magnitude squared processor 220, a voice activity detector 230, a block-wise averaging device 240, a block-wise gain computation processor 250, a multiplier 260 and an inverse fast Fourier transform processor 270.

As shown, a noisy speech input signal is coupled to an input of the fast Fourier transform processor 210, and an output of the fast Fourier transform processor 210 is coupled to an input of the magnitude squared processor 220 and to a first input of the multiplier 260. An output of the magnitude squared processor 220 is coupled to a first contact of the switch 225 and to a first input of the gain computation processor 250. An output of the voice activity detector 230 is coupled to a throw input of the switch 225, and a second contact of the switch 225 is coupled to an input of the block-wise averaging device 240. An output of the block-wise averaging device 240 is coupled to a second input of the gain computation processor 250, and an output of the gain computation processor 250 is coupled to a second input of the multiplier 260. An output of the multiplier 260 is coupled to an input of the inverse fast Fourier transform processor 270, and an output of the inverse fast Fourier transform processor 270 provides an output for the conventional spectral subtraction system 200.

In operation, the conventional spectral subtraction system 200 processes the incoming noisy speech signal, using the conventional spectral subtraction algorithm described above, to provide the cleaner, reduced-noise speech signal. In practice, the various components of FIG. 2 can be implemented using any known digital signal processing technology, including a general purpose computer, a collection of integrated circuits and/or application specific integrated circuitry (ASIC).

Note that in the conventional spectral subtraction algorithm, there are two parameters, a and k, which control the amount of noise subtraction and speech quality. Setting the first parameter to a=2 provides a power spectral subtraction, while setting the first parameter to a=1 provides magnitude spectral subtraction. Additionally, setting the first parameter to a=0.5 yields an increase in the noise reduction while only moderately distorting the speech. This is due to the fact that the spectra are compressed before the noise is subtracted from the noisy speech.

The second parameter k is adjusted so that the desired noise reduction is achieved. For example, if a larger k is chosen, the speech distortion increases. In practice, the parameter k is typically set depending upon how the first parameter a is chosen. A decrease in a typically leads to a decrease in the k parameter as well in order to keep the speech distortion low. In the case of power spectral subtraction, it is common to use over-subtraction (i.e., k>1).

The conventional spectral subtraction gain function (see equation (12)) is derived from a full block estimate and has zero phase. As a result, the corresponding impulse response $g_N(u)$ is non-causal and has length N (equal to the block length). Therefore, the multiplication of the gain function $G_N(l)$ and the input signal $X_N$ (see equation (11)) results in a periodic circular convolution with a non-causal filter. As described above, periodic circular convolution can lead to undesirable aliasing in the time domain, and the non-causal nature of the filter can lead to discontinuities between blocks and thus to inferior speech quality. Advantageously, the present invention provides methods and apparatus for providing correct convolution with a causal gain filter and thereby eliminates the above described problems of time domain aliasing and inter-block discontinuity.

With respect to the time domain aliasing problem, note that convolution in the time-domain corresponds to multiplication in the frequency-domain. In other words:

$$x(u)*y(u) \leftrightarrow X(f)\cdot Y(f),\ u=-\infty, \ldots, \infty \tag{13}$$

When the transformation is obtained from a fast Fourier transform (FFT) of length N, the result of the multiplication is not a correct convolution. Rather, the result is a circular convolution with a periodicity of N:

$$x_N \circledN y_N \tag{14}$$

where the symbol Ⓝ denotes circular convolution.

In order to obtain a correct convolution when using a fast Fourier transform, the accumulated order of the impulse responses $x_N$ and $y_N$ must be less than or equal to one less than the block length N−1.

Thus, according to the invention, the time domain aliasing problem resulting from periodic circular convolution can be solved by using a gain function $G_N(l)$ and an input signal block $X_N$ having a total order less than or equal to N−1.

According to conventional spectral subtraction, the spectrum $X_N$ of the input signal is of full block length N. However, according to the invention, an input signal block $x_L$ of length L (L<N) is used to construct a spectrum of order L. The length L is called the frame length and thus $x_L$ is one frame. Since the spectrum which is multiplied with the gain function of length N should also be of length N, the frame $x_L$ is zero padded to the full block length N, resulting in $X_{L\uparrow N}$.

In order to construct a gain function of length N, the gain function according to the invention can be interpolated from a gain function $G_M(l)$ of length M, where M<N, to form $G_{M\uparrow N}(l)$. To derive the low order gain function $G_{M\uparrow N}(l)$ according to the invention, any known or yet to be developed spectrum estimation technique can be used as an alternative to the above described simple Fourier transform periodogram. Several known spectrum estimation techniques provide lower variance in the resulting gain function. See, for example, J. G. Proakis and D. G. Manolakis, Digital Signal Processing; Principles, Algorithms, and Applications, *Macmillan*, Second Ed., 1992.

According to the well known Bartlett method, for example, the block of length N is divided in K sub-blocks of length M. A periodogram for each sub-block is then computed and the results are averaged to provide an M-long periodogram for the total block as:

$$\begin{aligned} P_{x,M}(f_u) &= \frac{1}{K}\sum_{k=0}^{K-1} P_{x,M,k}(f_u),\ f_u = \frac{u}{M},\ u = 0, \ldots, M-1 \\ &= \frac{1}{K}\sum_{k=0}^{K-1} |\mathcal{F}(x(k\cdot M+u))|^2 \end{aligned} \tag{15}$$

Advantageously, the variance is reduced by a factor K when the sub-blocks are uncorrelated, compared to the full block length periodogram. The frequency resolution is also reduced by the same factor.

Alternatively, the Welch method can be used. The Welch method is similar to the Bartlett method except that each sub-block is windowed by a Hanning window, and the sub-blocks are allowed to overlap each other, resulting in more sub-blocks. The variance provided by the Welch method is further reduced as compared to the Bartlett method. The Bartlett and Welch methods are but two spectral estimation techniques, and other known spectral estimation techniques can be used as well.

Irrespective of the precise spectral estimation technique implemented, it is possible and desirable to decrease the variance of the noise periodogram estimate even further by using averaging techniques. For example, under the assumption that the noise is longtime stationary, it is possible to average the periodograms resulting from the above described Bartlett and Welch methods. One technique employs exponential averaging as:

$$\overline{P}_{x,M}(l)=\alpha\cdot\overline{P}_{x,M}(l-1)+(1-\alpha)\cdot P_{x,M}(l) \tag{16}$$

In equation (16), the function $P_{x,M}(l)$ is computed using the Bartlett or Welch method, the function $\overline{P}_{x,M}(l)$ is the exponential average for the current block and the function $\overline{P}_{x,M}(l-1)$ is the exponential average for the previous block. The parameter $\alpha$ controls how long the exponential memory is, and typically should not exceed the length of how long the noise can be considered stationary. An $\alpha$ closer to 1 results in a longer exponential memory and a substantial reduction of the periodogram variance.

The length M is referred to as the sub-block length, and the resulting low order gain function has an impulse response of length M. Thus, the noise periodogram estimate $\overline{P}_{x_L,M}(l)$ and the noisy speech periodogram estimate $P_{x_L,M}(l)$ employed in the composition of the gain function are also of length M:

$$G_M(l)=\left(1-k\cdot\frac{\overline{P}^a_{x_L,M}(l)}{P^a_{x_L,M}(l)}\right)^{\frac{1}{a}} \tag{17}$$

According to the invention, this is achieved by using a shorter periodogram estimate from the input frame $X_L$ and averaging using, for example, the Bartlett method. The Bartlett method (or other suitable estimation method) decreases the variance of the estimated periodogram, and there is also a reduction in frequency resolution. The reduction of the resolution from L frequency bins to M bins means that the periodogram estimate $P_{x_L,M}(l)$ is also of length M. Additionally, the variance of the noise periodogram estimate $\overline{P}_{x_L,M}(l)$ can be decreased further using exponential averaging as described above.

To meet the requirement of a total order less than or equal to N−1, the frame length L, added to the sub-block length M, is made less than N. As a result, it is possible to form the desired output block as:

$$S_N=G_{M\uparrow N}(l)\odot X_{L\uparrow N} \tag{18}$$

Advantageously, the low order filter according to the invention also provides an opportunity to address the problems created by the non-causal nature of the gain filter in the conventional spectral subtraction algorithm (i.e., inter-block discontinuity and diminished speech quality). Specifically, according to the invention, a phase can be added to the gain function to provide a causal filter. According to exemplary embodiments, the phase can be constructed from a magnitude function and can be either linear phase or minimum phase as desired.

To construct a linear phase filter according to the invention, first observe that if the block length of the FFT is of length M, then a circular shift in the time-domain is a multiplication with a phase function in the frequency-domain:

$$g(n-l)_M \leftrightarrow G_M(f_u)\cdot e^{-j2\pi ul/M},\ f_u=\frac{u}{M},\ u=0,\ \ldots,\ M-1 \tag{19}$$

In the instant case, 1 equals M/2+1, since the first position in the impulse response should have zero delay (i.e., a causal filter). Therefore:

$$g(n-(M/2+1))_M \leftrightarrow G_M(f_u)\cdot e^{-j\pi u\left(1+\frac{2}{M}\right)} \tag{20}$$

and the linear phase filter $\overline{G}_M(f_u)$ is thus obtained as $$\overline{G}_M(f_u)=G_M(f_u)\cdot e^{-j\pi u\left(1+\frac{2}{M}\right)} \tag{21}$$

According to the invention, the gain function is also interpolated to a length N, which is done, for example, using a smooth interpolation. The phase that is added to the gain function is changed accordingly, resulting in:

$$\overline{G}_{M/N}(f_u)=G_{M/N}(f_u)\cdot e^{-j\pi u\left(1+\frac{2}{M}\right)\cdot\frac{M}{N}} \tag{22}$$

Advantageously, construction of the linear phase filter can also be performed in the time-domain. In such case, the gain function $G_M(f_u)$ is transformed to the time-domain using an IFFT, where the circular shift is done. The shifted impulse response is zero-padded to a length N, and then transformed back using an N-long FFT. This leads to an interpolated causal linear phase filter $\overline{G}_{M\uparrow N}(f_u)$ as desired.

A causal minimum phase filter according to the invention can be constructed from the gain function by employing a Hilbert transform relation. See, for example, A. V. Oppenheim and R. W. Schafer, Discrete-Time Signal Processing, Prentic-Hall, Inter. Ed., 1989. The Hilbert transform relation implies a unique relationship between real and imaginary parts of a complex function. Advantageously, this can also be utilized for a relationship between magnitude and phase, when the logarithm of the complex signal is used, as:

$$\begin{aligned}\ln(|G_M(f_u)|\cdot e^{j\cdot arg(G_M(f_u))}) &= \ln(|G_M(f_u)|)+\ln(e^{j\cdot arg(G_M(f_u))})\\ &= \ln(|G_M(f_u)|)+j\cdot\arg(G_M(f_u))\end{aligned} \tag{23}$$

In the present context, the phase is zero, resulting in a real function. The function $\ln(|G_M(f_u)|)$ is transformed to the time-domain employing an IFFT of length M, forming $g_M(n)$. The time-domain function is rearranged as:

$$\overline{g}_M(n)=\begin{cases}2\cdot g_M(n), & n=1,2,\ \ldots,\ M/2-1\\ g_M(n), & n=0,\ M/2\\ 0, & n=M/2+1,\ \ldots,\ M-1\end{cases} \tag{24}$$

The function $\overline{g}_M(n)$ is transformed back to the frequency-domain using an M-long FFT, yielding $\ln(|\overline{G}_M(f_u)|\cdot e^{j\cdot arg(\overline{G}_M(f_u))})$. From this, the function $\overline{G}_M(f_u)$ is formed. The causal minimum phase filter $\overline{G}_M(f_u)$ is then interpolated to a length N. The interpolation is made the same way as in the linear phase case described above. The resulting interpolated filter $G_{M\uparrow N}(f_u)$ is causal and has approximately minimum phase.

Figure 3:
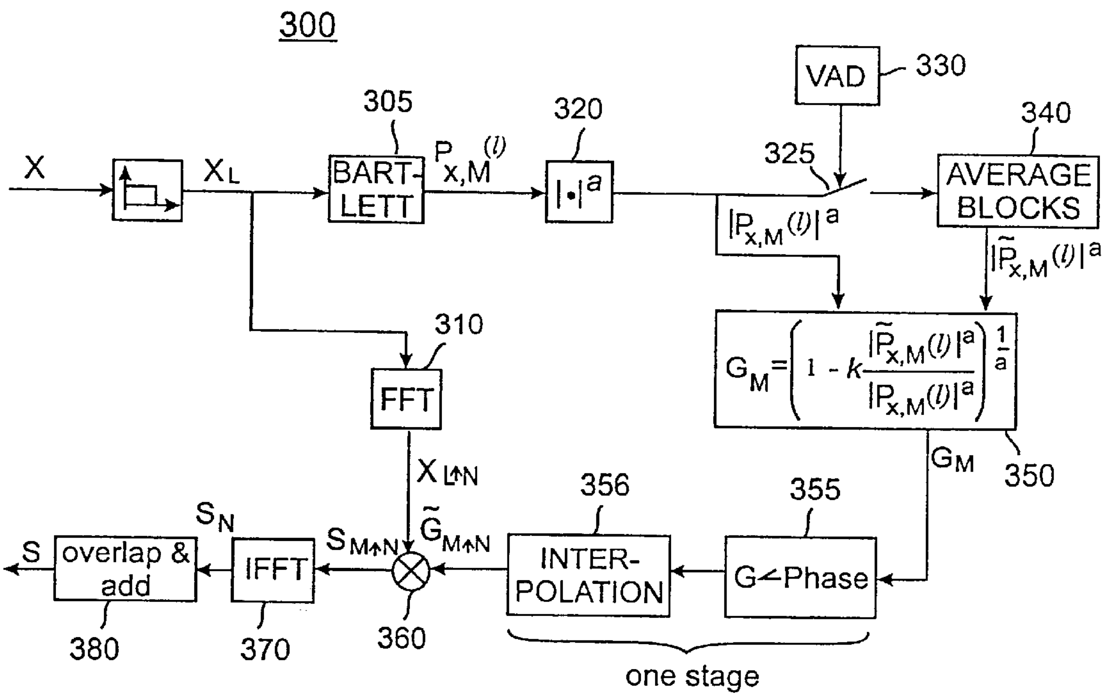
FIGS. 3–4 depict exemplary spectral subtraction noise reduction processors according to the invention.

The above described spectral subtraction scheme according to the invention is depicted in FIG. 3. In FIG. 3, a spectral subtraction noise reduction processor 300, providing linear convolution and causal-filtering, is shown to include a Bartlett processor 305, a magnitude squared processor 320, a voice activity detector 330, a block-wise averaging processor 340, a low order gain computation processor 350, a gain phase processor 355, an interpolation processor 356, a multiplier 360, an inverse fast Fourier transform processor 370 and an overlap and add processor 380.

As shown, the noisy speech input signal is coupled to an input of the Bartlett processor 305 and to an input of the fast Fourier transform processor 310. An output of the Bartlett processor 305 is coupled to an input of the magnitude squared processor 320, and an output of the fast Fourier transform processor 310 is coupled to a first input of the multiplier 360. An output of the magnitude squared processor 320 is coupled to a first contact of the switch 325 and to a first input of the low order gain computation processor 350. A control output of the voice activity detector 330 is coupled to a throw input of the switch 325, and a second contact of the switch 325 is coupled to an input of the block-wise averaging device 340.

An output of the block-wise averaging device 340 is coupled to a second input of the low order gain computation processor 350, and an output of the low order gain computation processor 350 is coupled to an input of the gain phase processor 355. An output of the gain phase processor 355 is coupled to an input of the interpolation processor 356, and an output of the interpolation processor 356 is coupled to a second input of the multiplier 360. An output of the multiplier 360 is coupled to an input of the inverse fast Fourier transform processor 370, and an output of the inverse fast Fourier transform processor 370 is coupled to an input of the overlap and add processor 380. An output of the overlap and add processor 380 provides a reduced noise, clean speech output for the exemplary noise reduction processor 300.

In operation, the spectral subtraction noise reduction processor 300 according to the invention processes the incoming noisy speech signal, using the linear convolution, causal filtering algorithm described above, to provide the clean, reduced-noise speech signal. In practice, the various components of FIG. 3 can be implemented using any known digital signal processing technology, including a general purpose computer, a collection of integrated circuits and/or application specific integrated circuitry (ASIC).

Advantageously, the variance of the gain function $G_M(l)$ of the invention can be decreased still further by way of a controlled exponential gain function averaging scheme according to the invention. According to exemplary embodiments, the averaging is made dependent upon the discrepancy between the current block spectrum $P_{x,M}(l)$ and the averaged noise spectrum $\overline{P}_{x,M}(l)$. For example, when there is a small discrepancy, long averaging of the gain function $G_M(l)$ can be provided, corresponding to a stationary background noise situation. Conversely, when there is a large discrepancy, short averaging or no averaging of the gain function $G_M(l)$ can be provided, corresponding to situations with speech or highly varying background noise.

In order to handle the transient switch from a speech period to a background noise period, the averaging of the gain function is not increased in direct proportion to decreases in the discrepancy, as doing so introduces an audible shadow voice (since the gain function suited for a speech spectrum would remain for a long period). Instead, the averaging is allowed to increase slowly to provide time for the gain function to adapt to the stationary input.

According to exemplary embodiments, the discrepancy measure between spectra is defined as $$\beta(l) = \frac{\sum_u |P_{x,M,u}(l) - \overline{P}_{x,M,u}(l)|}{\sum_u \overline{P}_{x,M,u}(l)} \tag{25}$$

where $\beta(l)$ is limited by $$\beta(l) \Leftarrow \begin{cases} 1, & \beta(l) > 1 \\ \beta(l), & \beta_{\min} \le \beta(l) \le 1,\ 0 \le \beta_{\min} \ll 1 \\ \beta_{\min}, & \beta(l) < \beta_{\min} \end{cases} \tag{26}$$

and where $\beta(l)=1$ results in no exponential averaging of the gain function, and $\beta(l)=\beta_{min}$ provides the maximum degree of exponential averaging.

The parameter $\overline{\beta}(l)$ is an exponential average of the discrepancy between spectra, described by $$\overline{\beta}(l)=\gamma\cdot\overline{\beta}(l-1)+(1-\gamma)\cdot\beta(l) \tag{27}$$

The parameter $\gamma$ in equation (27) is used to ensure that the gain function adapts to the new level, when a transition from a period with high discrepancy between the spectra to a period with low discrepancy appears. As noted above, this is done to prevent shadow voices. According to the exemplary embodiments, the adaption is finished before the increased exponential averaging of the gain function starts due to the decreased level of $\beta(l)$. Thus:

$$\gamma = \begin{cases} 0, & \overline{\beta}(l-1) < \beta(l) \\ \gamma_c, & \overline{\beta}(l-1) \ge \beta(l),\ 0 < \gamma_c < 1 \end{cases} \tag{28}$$

When the discrepancy $\beta(l)$ increases, the parameter $\overline{\beta}(l)$ follows directly, but when the discrepancy decreases, an exponential average is employed on $\beta(l)$ to form the averaged parameter $\overline{\beta}(l)$. The exponential averaging of the gain function is described by:

$$\overline{G}_M(l)=(1-\overline{\beta}(l))\cdot\overline{G}_M(l-1)+\overline{\beta}(l)\cdot G_M(l) \tag{29}$$

The above equations can be interpreted for different input signal conditions as follows. During noise periods, the variance is reduced. As long as the noise spectra has a steady mean value for each frequency, it can be averaged to decrease the variance. Noise level changes result in a discrepancy between the averaged noise spectrum $\overline{P}_{x,M}(l)$ and the spectrum for the current block $P_{x,M}(l)$. Thus, the controlled exponential averaging method decreases the gain function averaging until the noise level has stabilized at a new level. This behavior enables handling of the noise level changes and gives a decrease in variance during stationary noise periods and prompt response to noise changes. High energy speech often has time-varying spectral peaks. When the spectral peaks from different blocks are averaged, their spectral estimate contains an average of these peaks and thus looks like a broader spectrum, which results in reduced speech quality. Thus, the exponential averaging is kept at a minimum during high energy speech periods. Since the discrepancy between the average noise spectrum $\overline{P}_{x,M}(l)$ and the current high energy speech spectrum $P_{x,M}(l)$ is large, no exponential averaging of the gain function is performed. During lower energy speech periods, the exponential averaging is used with a short memory depending on the discrepancy between the current low-energy speech spectrum and the averaged noise spectrum. The variance reduction is consequently lower for low-energy speech than during background noise periods, and larger compared to high energy speech periods.

Figure 4:
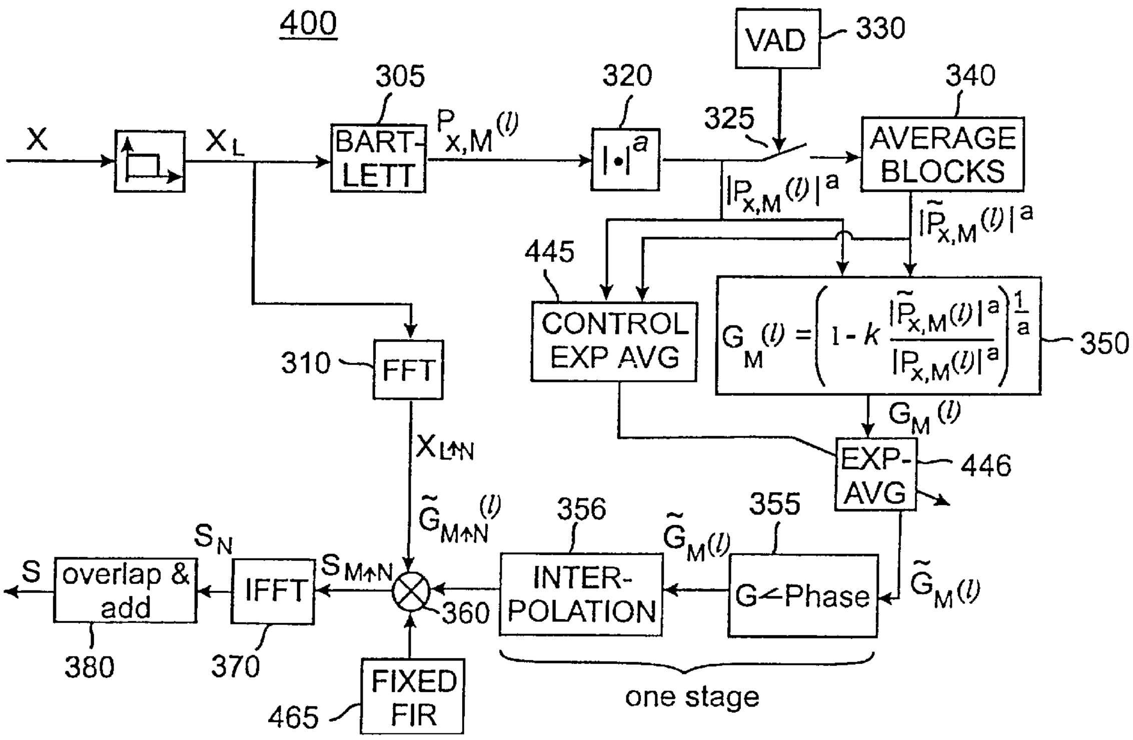
Figure 5A:
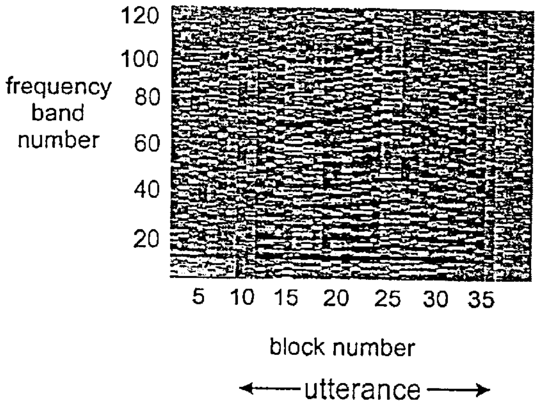
FIG. 5 depicts exemplary spectrograms derived using spectral subtraction techniques according to the invention.
Figure 5B:
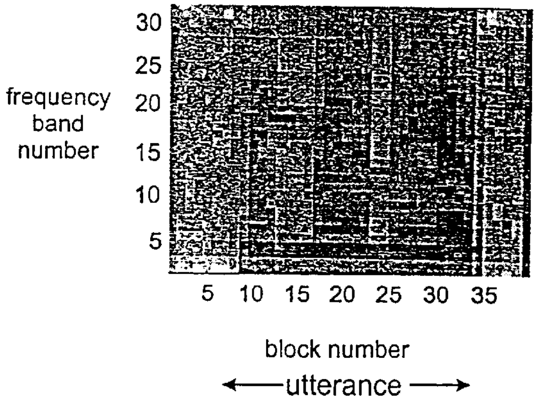
Figure 5C:
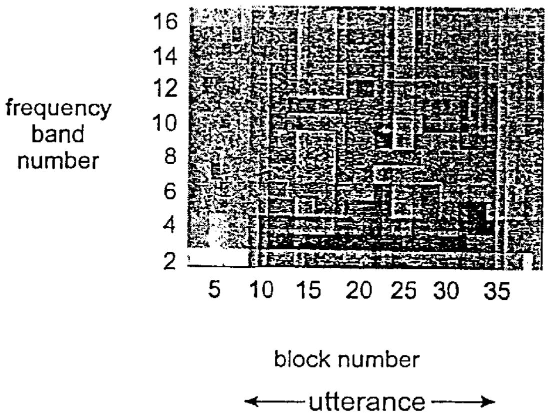
Figure 5D:
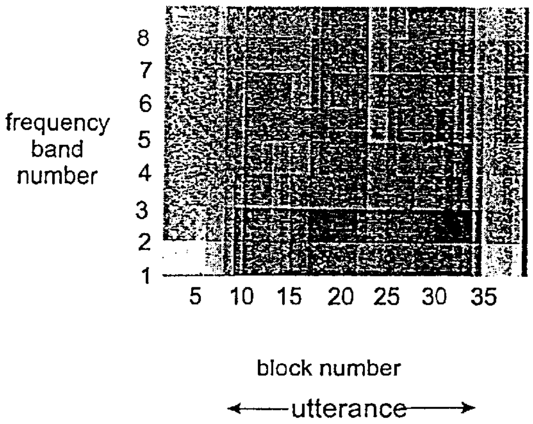

The above described spectral subtraction scheme according to the invention is depicted in FIG. 4. In FIG. 4, a spectral subtraction noise reduction processor 400, providing linear convolution, causal-filtering and controlled exponential averaging, is shown to include the Bartlett processor 305, the magnitude squared processor 320, the voice activity detector 330, the block-wise averaging device 340, the low order gain computation processor 350, the gain phase processor 355, the interpolation processor 356, the multiplier 360, the inverse fast Fourier transform processor 370 and the overlap and add processor 380 of the system 300 of FIG. 3, as well as an averaging control processor 445, an exponential averaging processor 446 and an optional fixed FIR post filter 465.

As shown, the noisy speech input signal is coupled to an input of the Bartlett processor 305 and to an input of the fast Fourier transform processor 310. An output of the Bartlett processor 305 is coupled to an input of the magnitude squared processor 320, and an output of the fast Fourier transform processor 310 is coupled to a first input of the multiplier 360. An output of the magnitude squared processor 320 is coupled to a first contact of the switch 325, to a first input of the low order gain computation processor 350 and to a first input of the averaging control processor 445.

A control output of the voice activity detector 330 is coupled to a throw input of the switch 325, and a second contact of the switch 325 is coupled to an input of the block-wise averaging device 340. An output of the block-wise averaging device 340 is coupled to a second input of the low order gain computation processor 350 and to a second input of the averaging controller 445. An output of the low order gain computation processor 350 is coupled to a signal input of the exponential averaging processor 446, and an output of the averaging controller 445 is coupled to a control input of the exponential averaging processor 446.

An output of the exponential averaging processor 446 is coupled to an input of the gain phase processor 355, and an output of the gain phase processor 355 is coupled to an input of the interpolation processor 356. An output of the interpolation processor 356 is coupled to a second input of the multiplier 360, and an output of the optional fixed FIR post filter 465 is coupled to a third input of the multiplier 360. An output of the multiplier 360 is coupled to an input of the inverse fast Fourier transform processor 370, and an output of the inverse fast Fourier transform processor 370 is coupled to an input of the overlap and add processor 380. An output of the overlap and add processor 380 provides a clean speech signal for the exemplary system 400.

In operation, the spectral subtraction noise reduction processor 400 according to the invention processes the incoming noisy speech signal, using the linear convolution, causal filtering and controlled exponential averaging algorithm described above, to provide the improved, reduced-noise speech signal. As with the embodiment of FIG. 3, the various components of FIG. 4 can be implemented using any known digital signal processing technology, including a general purpose computer, a collection of integrated circuits and/or application specific integrated circuitry (ASIC).

Note that since the sum of the frame length L and the sub-block length M are chosen, according to exemplary embodiments, to be shorter than N−1, the extra fixed FIR filter 465 of length $J \leqq N-1-L-M$ can be added as shown in FIG. 4. The post filter 465 is applied by multiplying the interpolated impulse response of the filter with the signal spectrum as shown. The interpolation to a length N is performed by zero padding of the filter and employing an N-long FFT. This post filter 465 can be used to filter out the telephone bandwidth or a constant tonal component. Alternatively, the functionality of the post filter 465 can be included directly within the gain function.

The parameters of the above described algorithm are set in practice based upon the particular application in which the algorithm is implemented. By way of example, parameter selection is described hereinafter in the context of a hands-free GSM automobile mobile telephone.

First, based on the GSM specification, the frame length L is set to 160 samples, which provides 20 ms frames. Other choices of L can be used in other systems. However, it should be noted that an increment in the frame length L corresponds to an increment in delay. The sub-block length M (e.g., the periodogram length for the Bartlett processor) is made small to provide increased variance reduction M. Since an FFT is used to compute the periodograms, the length M can be set conveniently to a power of two. The frequency resolution is then determined as:

$$B = \frac{F_s}{M} \tag{30}$$

The GSM system sample rate is 8000 Hz. Thus a length M=16, M=32 and M=64 gives a frequency resolution of 500 Hz, 250 Hz and 125 Hz, respectively, as illustrated in FIG. 5. In FIG. 5, plot (a) depicts a simple periodogram of a clean speech signal, and plots (b), (c) and (d) depict periodograms computed for a clean speech signal using the Bartlett method with 32, 16 and 8 frequency bands, respectively. A frequency resolution of 250 Hz is reasonable for speech and noise signals, thus M=32. This yields a length L+M=160+32=192, which should be less than N−1 as described above. Thus, N is chosen, for example, to be a power of two which is greater than 192 (e.g., N=256). In such case, an optional FIR post filter of length $J \leqq 63$ can be applied if desired.

Figure 6:
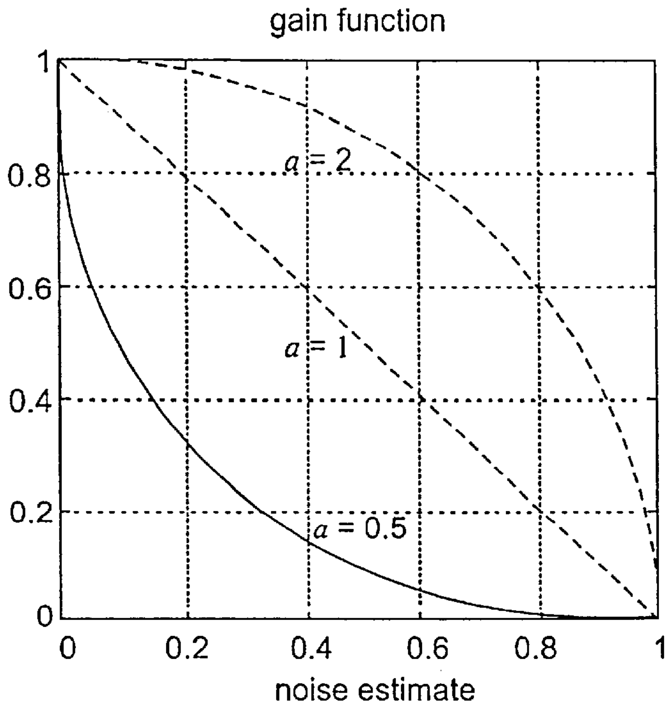
FIGS. 6–7 depict exemplary gain functions derived using spectral subtraction techniques according to the invention.

As noted above, the amount of noise subtraction is controlled by the a and k parameters. A parameter choice of a=0.5 (i.e., square root spectral subtraction) provides a strong noise reduction while maintaining low speech distortion. This is shown in FIG. 6 (where the speech plus noise estimate is 1 and k is 1). Note from FIG. 6 that a=0.5 provides more noise reduction as compared to higher values of a. For clarity, FIG. 6 presents only one frequency bin, and it is the SNR for this frequency bin that is referred to hereinafter.

Figure 7:
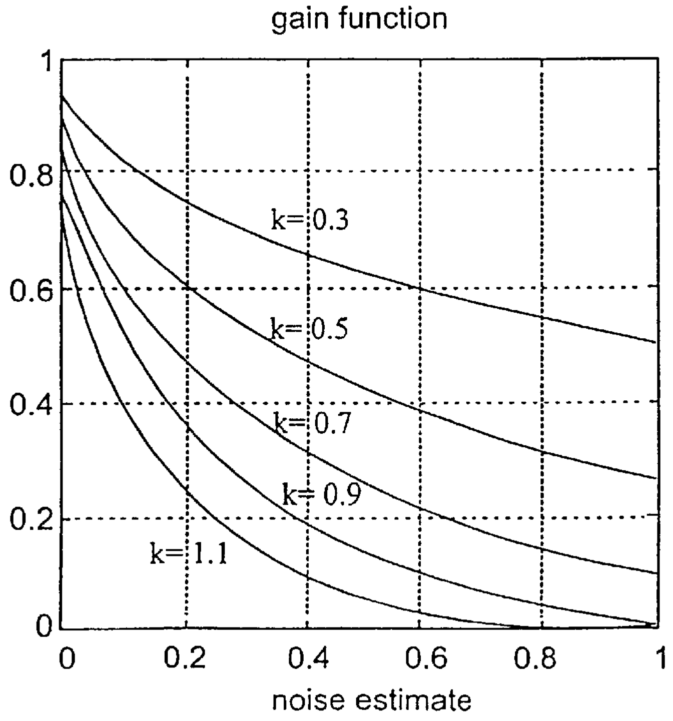
Figure 8A:
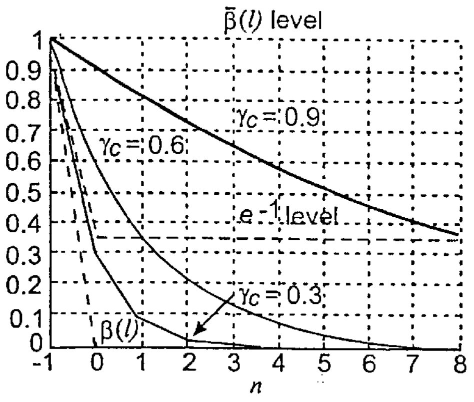
FIGS. 8–28 depict simulations of exemplary spectral subtraction techniques according to the invention.
Figure 8B:
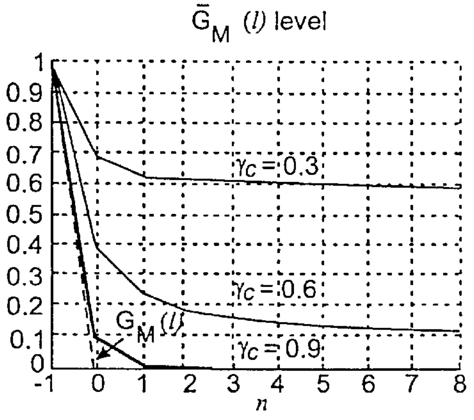
Figure 8C:
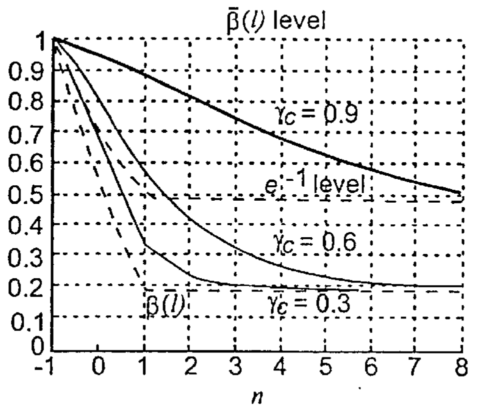
Figure 8D:
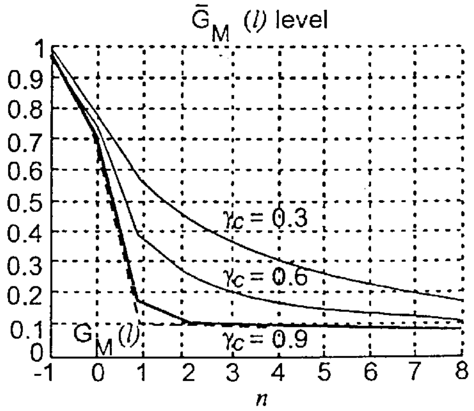

According to exemplary embodiments, the parameter k is made comparably small when a=0.5 is used. In FIG. 7, the gain function for different k values are illustrated for a=0.5 (again, the speech plus noise estimate is 1). The gain function should be continuously decreasing when moving toward lower SNR, which is the case when $k \leqq 1$. Simulations show that k=0.7 provides low speech distortion while maintaining high noise reduction.

As described above, the noise spectrum estimate is exponentially averaged, and the parameter $\alpha$ controls the length of the exponential memory. Since, the gain function is averaged, the demand for noise spectrum estimate averaging will be less. Simulations show that $0.6<\alpha<0.9$ provides the desired variance reduction, yielding a time constant $\tau_{frame}$ of approximately 2 to 10 frames:

$$\tau_{frame} \approx -\frac{1}{\ln \alpha} \tag{31}$$

The exponential averaging of the noise estimate is chosen, for example, as $\alpha=0.8$.

The parameter $\beta_{min}$ determines the maximum time constant for the exponential averaging of the gain function. The time constant $\tau_{\beta_{min}}$, specified in seconds, is used to determine $\beta_{min}$ as:

$$\beta_{\min} = 1 - e^{-\frac{L}{F_S \cdot \tau_{\beta_{\min}}}} \quad (32)$$

A time constant of 2 minutes is reasonable for a stationary noise signal, corresponding to $\beta_{min} \approx 0$. In other words, there is no need for a lower limit on $\beta(l)$ (in equation (32)), since $\beta(l) \geqq 0$ (according to equation (25)).

The parameter $\gamma_c$ controls how fast the memory of the controlled exponential averaging is allowed to increase when there is a transition from speech to a stationary input signal (i.e., how fast the $\bar{\beta}(l)$ parameter is allowed to decrease referring to equations (27) and (28)). When the averaging of the gain function is done using a long memory, it results in a shadow voice, since the gain function remembers the speech spectrum.

Consider, for example, an extreme situation where the discrepancy between the noisy speech spectrum estimate $P_M(l)$ and the noise spectrum estimate $\bar{P}_M(l)$ goes from one extreme value to another. In the first instance, the discrepancy is large such that $G_M(l) \approx 1$ for all frequencies over a long period of time. Thus, $\beta(l) = \bar{\beta}(l) = 1$. Next, the spectrum estimates are manipulated so that $P_M(l) = \bar{P}_M(l)$, in order to simulate an extreme situation, where the $\beta(l)=0$ and $G_M(l) = (1-k)^{1/a}$. The $\bar{\beta}(l)$ parameter will decrease to zero depending on the parameter $\gamma_c$. Thus, the parameter values are:

$$\bar{\beta}(-1)=1,\ \bar{G}_M(-1)=1,$$

$$\beta(-1)=1,\ G_M(-1)=1,$$

$$\beta(l)=0,\ G_M(l)=0.09,\ l=0, 1, 2, \ldots \quad (33)$$

Figure 9:
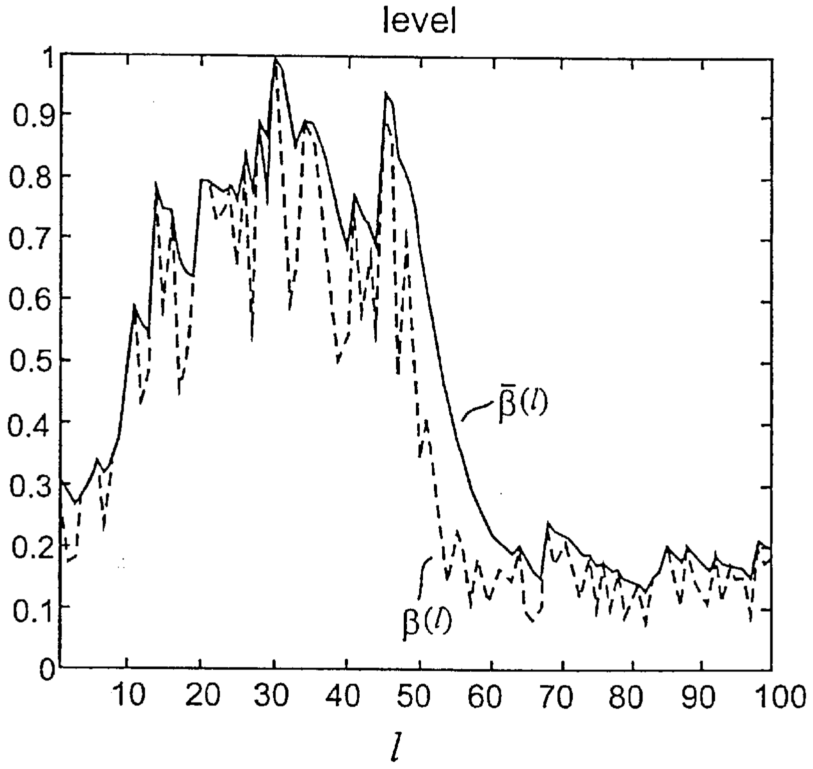

Inserting the given parameters into equations (27) and (29) yields:

$$\bar{\beta}(l)=\gamma_c^{(l+1)} \quad (34)$$

$$\bar{G}_M(l)=(1-\bar{\beta}(l))\cdot \bar{G}_M(l-1)+0.09\cdot\bar{\beta}(l) \quad (35)$$

where l is the number of blocks after the decrease of energy. If the gain function is chosen to have reached the time constant level $e^{-1}$ after 2 frames, $\gamma_c \approx 0.506$. This extreme situation is shown in plots (a) and (b) of FIG. 8 for different values of $\gamma_c$. A more realistic simulation with a slower decrease in energy is also presented in plots (c) and (d) of FIG. 8. The $e^{-1}$ level line represents the level of one time constant (i.e., when this level is crossed, one time constant has passed). The result of a real simulation using recorded input signals is presented in FIG. 9, and $\gamma_c=0.8$ is shown to be a good choice for preventing shadow voices.

Hereinafter, results obtained using the parameter choices suggested above are provided. Advantageously, the simulated results show improvements in speech quality and residual background noise quality as compared to other spectral subtraction approaches, while still providing a strong noise reduction. The exponential averaging of the gain function is mainly responsible for the increased quality of the residual noise. The correct convolution in combination with the causal filtering increases the overall sound quality, and makes it possible to have a short delay.

In the simulations, the well known GSM voice activity detector (see, for example, European Digital Cellular Telecommunications Systems (Phase 2); Voice Activity Detection (VAD) (GSM 06.32), *European Telecommunications Standards Institute,* 1994) has been used on a noisy speech signal. The signals used in the simulations were combined from separate recordings of speech and noise recorded in a car. The speech recording is performed in a quiet car using hands-free equipment and an analog telephone bandwidth filter. The noise sequences are recorded using the same equipment in a moving car.

Figure 10:
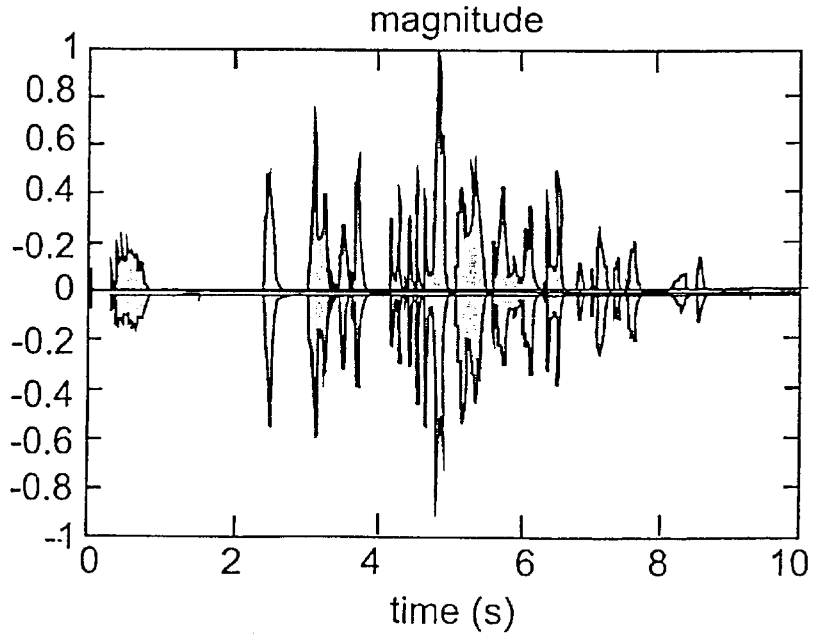
Figure 11:
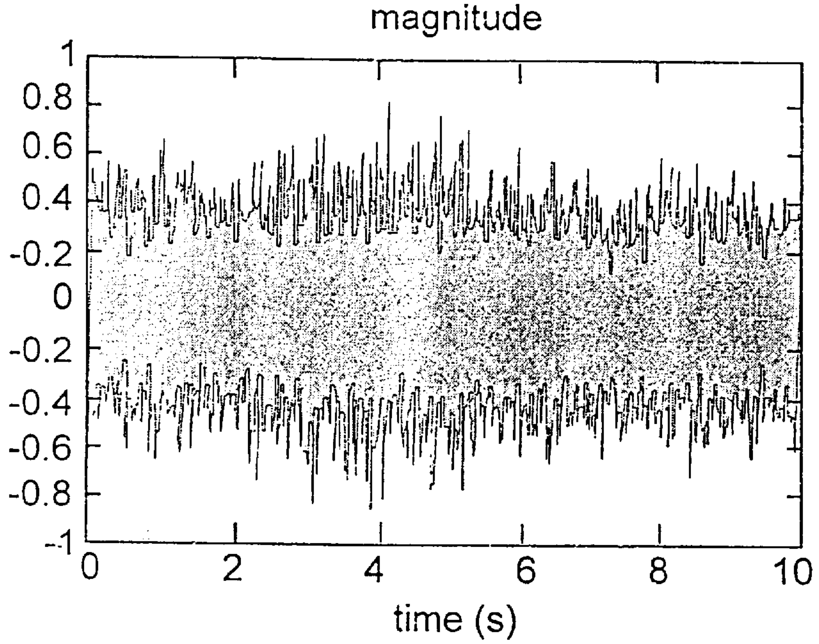
Figure 12:
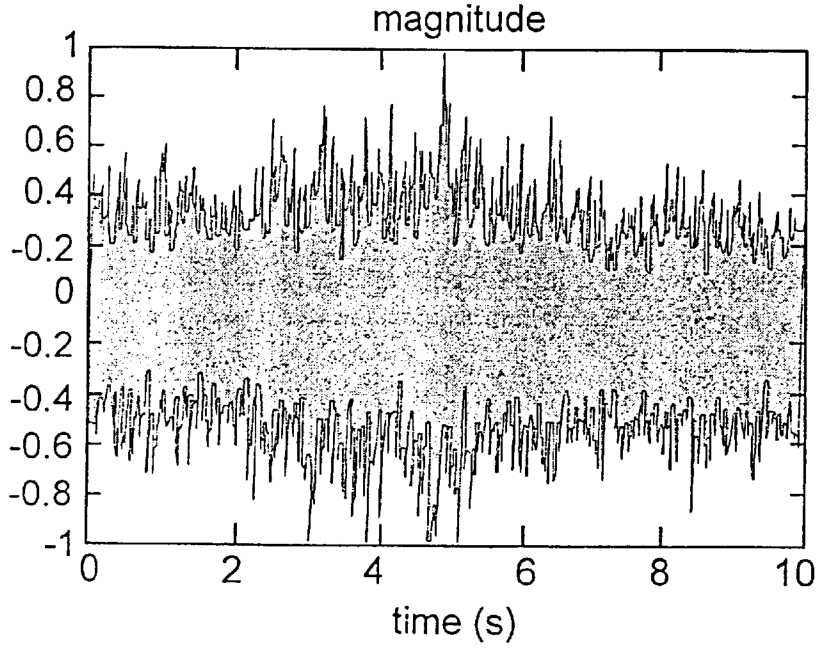
Figure 13:
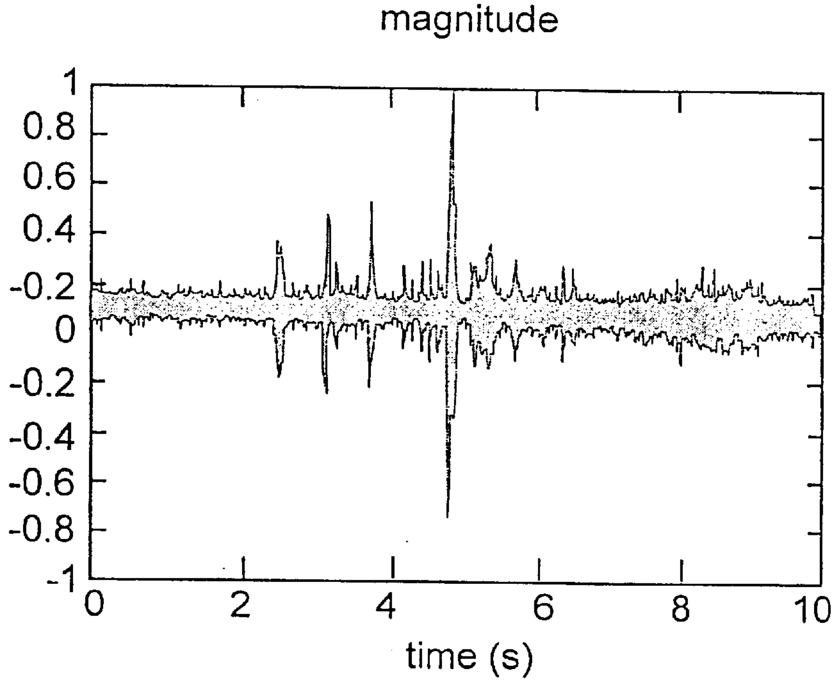
Figure 14:
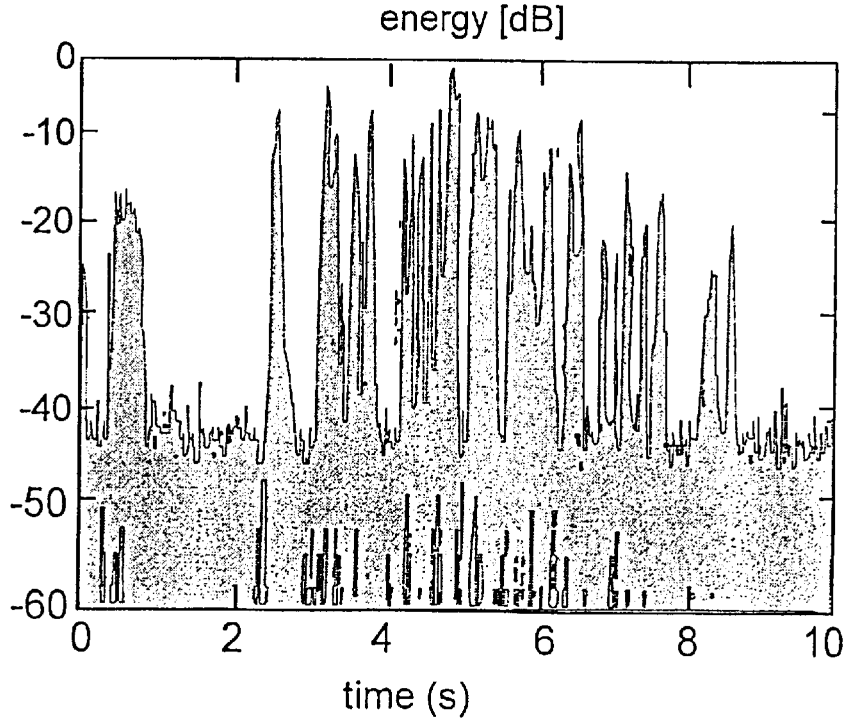
Figure 15:
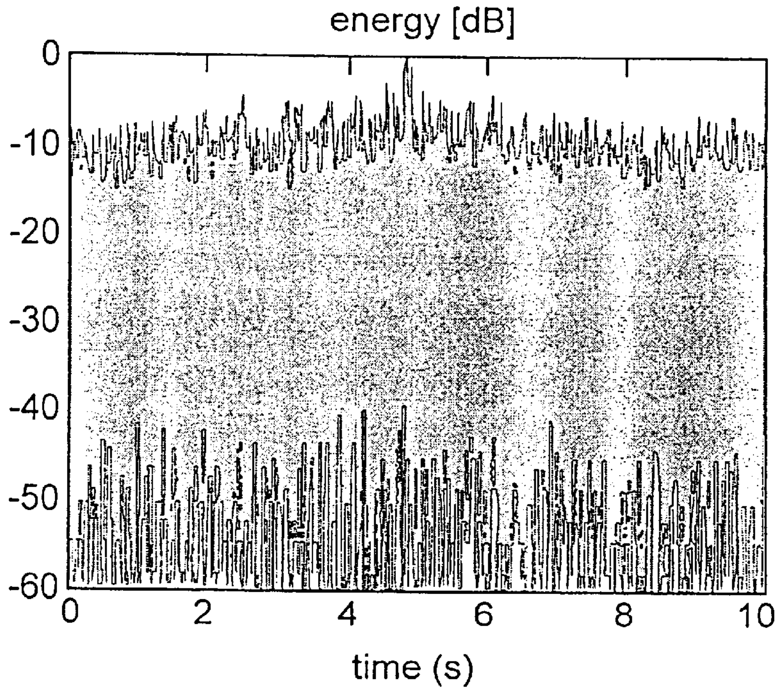
Figure 16:
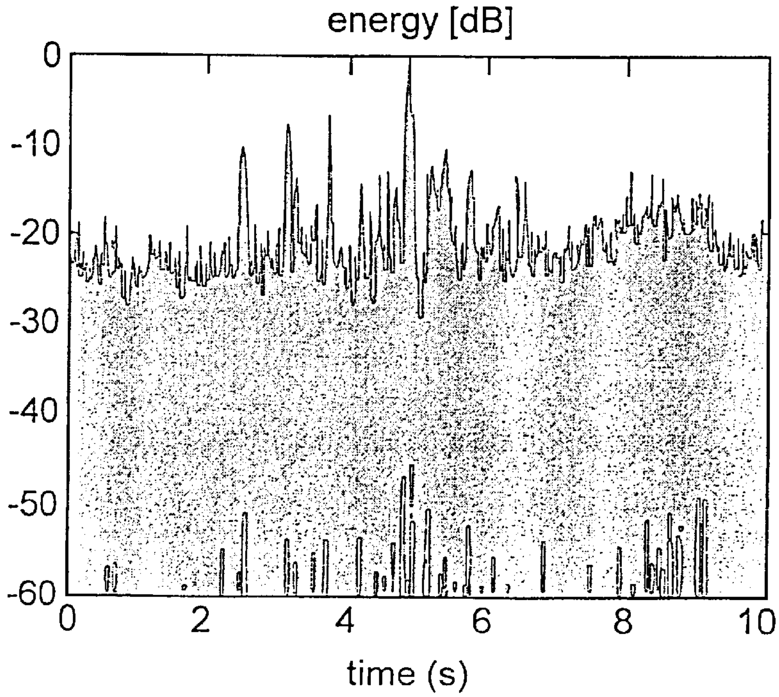
Figure 17:
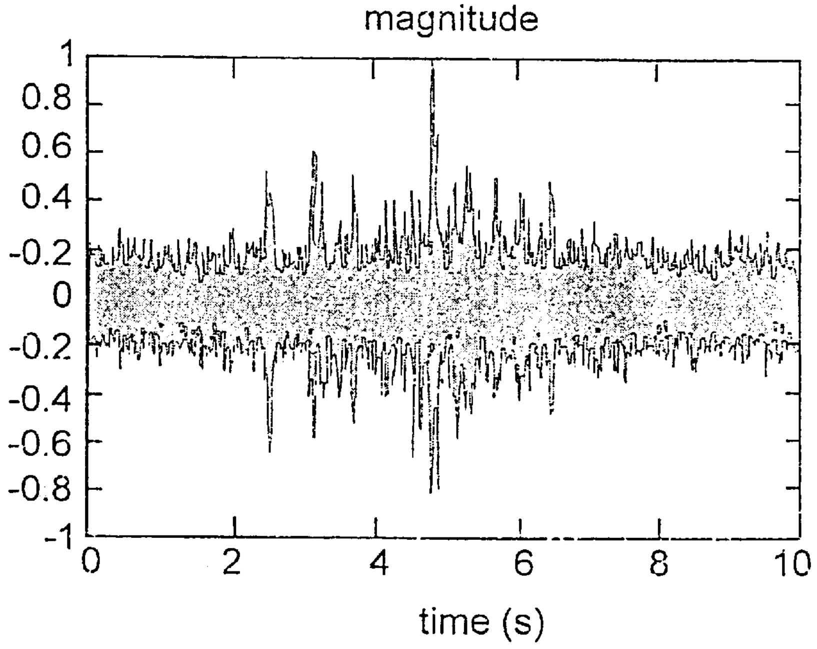
Figure 18:
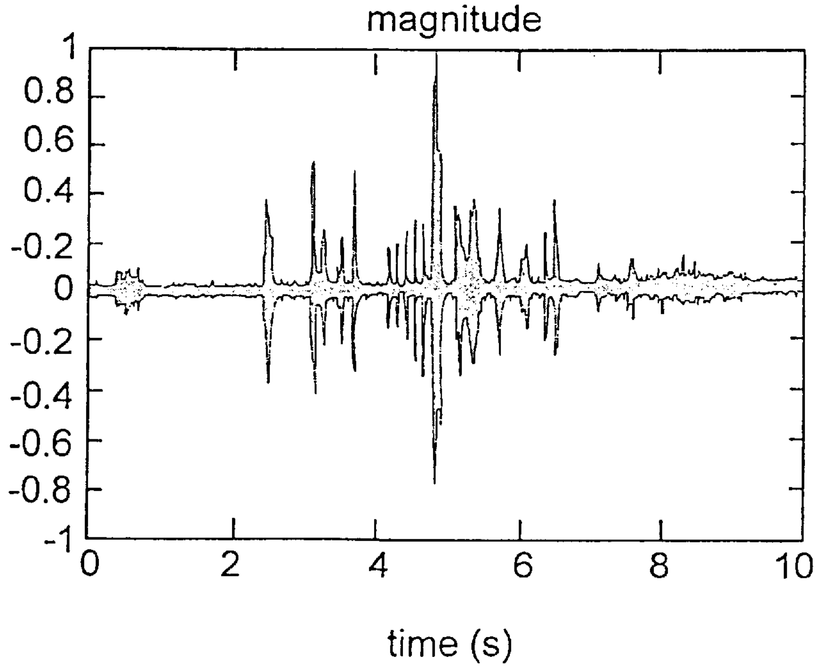
Figure 19:
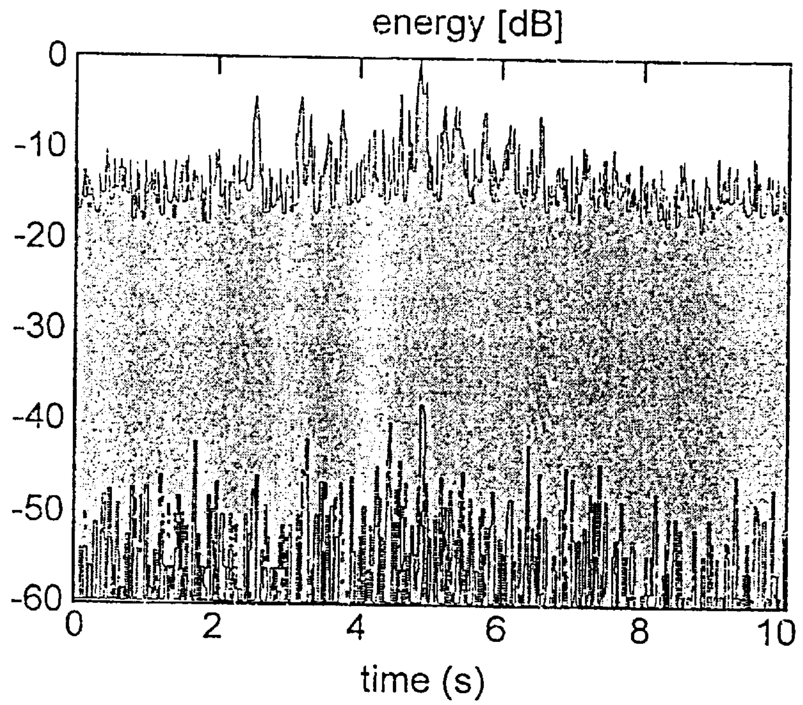
Figure 20:
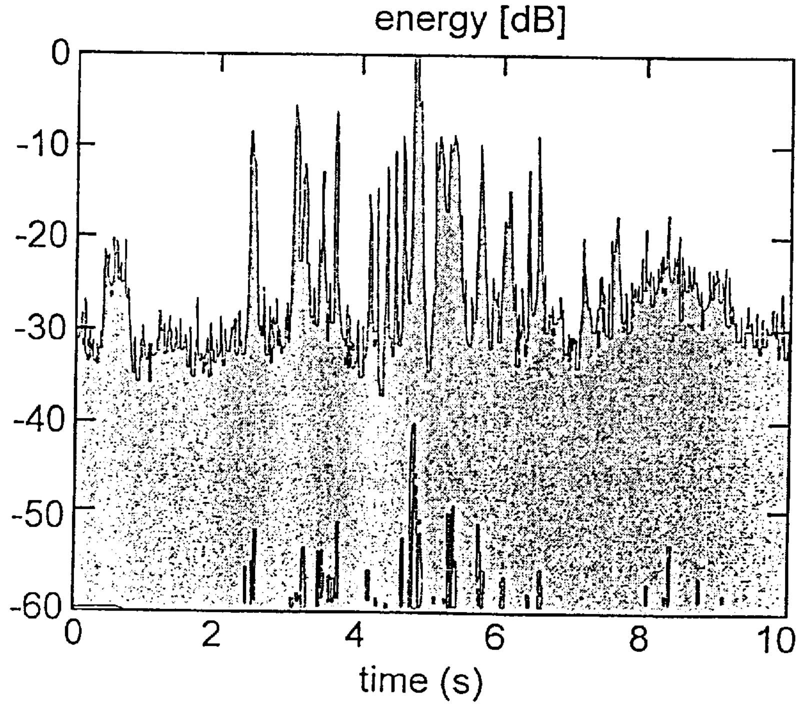

The noise reduction performed is compared to the speech quality received. The parameter choices above value good sound quality in comparison to large noise reduction. When more aggressive choices are made, an improved noise reduction is obtained. FIGS. 10 and 11 present the input speech and noise, respectively, where the two inputs are added together using a 1:1 relationship. The resulting noisy input speech signal is presented in FIG. 12. The noise reduced output signal is illustrated in FIG. 13. The results can also be presented in an energy sense, which makes it easy to compute the noise reduction and also reveals if some speech periods are not enhanced. FIGS. 14, 15 and 16 present the clean speech, the noisy speech and the resulting output speech after the noise reduction, respectively. As shown, a noise reduction in the vicinity of 13 dB is achieved. When an input is formed using speech and car noise added together in a 2:1 relationship, the input SNR increase is as presented in FIGS. 17 and 19. The resulting signals are presented in FIGS. 18 and 20, where a noise reduction close to 18 dB can be estimated.

Additional simulations were run to clearly show the importance of having appropriate impulse response length of the gain function as well as causal properties. The sequences presented hereinafter are all from noisy speech of length 30 seconds. The sequences are presented as absolute mean averages of the output from the IFFT, $|s_N|$ (see FIG. 4). The IFFT gives 256 long data blocks, the absolute value of each data value is taken and averaged. Thus, the effects of different choices of gain function can be seen clearly (i.e., non-causal filter, shorter and longer impulse responses, minimum phase or linear phase).

Figure 21:
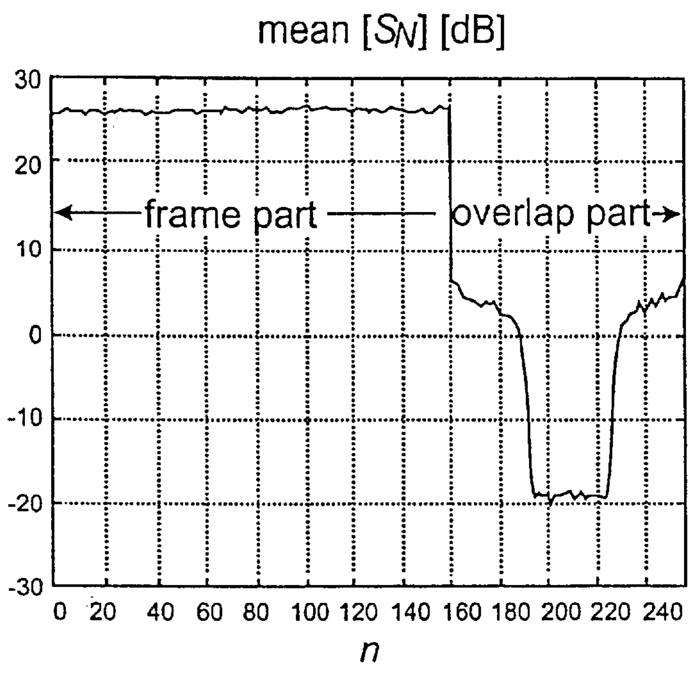

FIG. 21 presents the mean $|s_N|$ resulting from a gain function with an impulse response of the shorter length M, and is non-causal since the gain function has zero-phase. This can be observed by the high level in the M=32 samples at the end of the averaged block.

Figure 22:
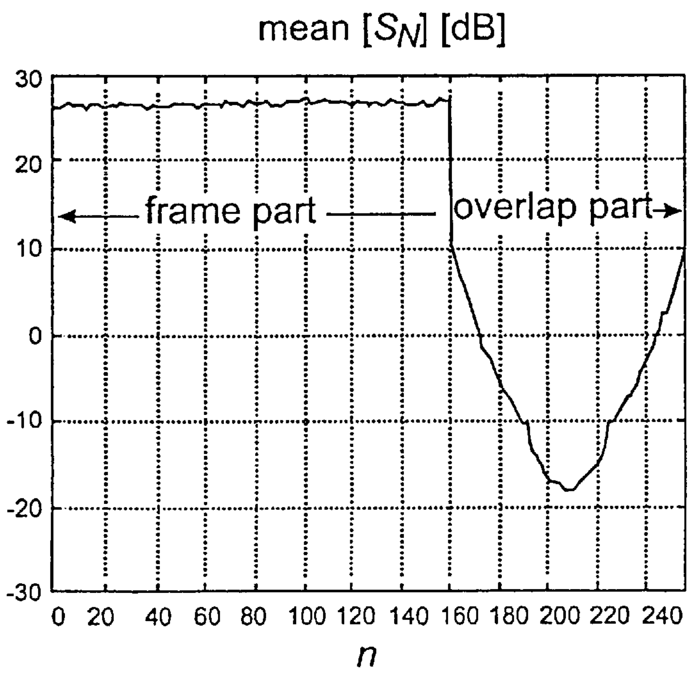

FIG. 22 presents the mean $|s_N|$ resulting from a gain function with an impulse response of the full length N, and is non-causal since the gain function has zero-phase. This can be observed by the high level in the samples at the end of the averaged block. This case corresponds to the gain function for the conventional spectral subtraction, regarding the phase and length. The full length gain function is obtained by interpolating the noise and noisy speech periodograms instead of the gain function.

Figure 23:
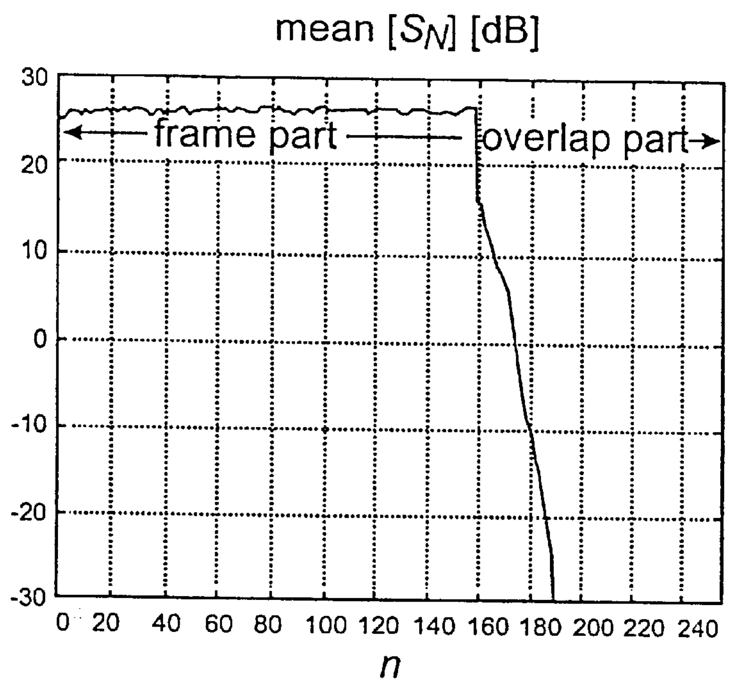

FIG. 23 presents the mean $|s_N|$ resulting from a minimum-phase gain function with an impulse response of the shorter length M. The minimum-phase applied to the gain function makes it causal. The causality can be observed by the low level in the samples at the end of the averaged block. The minimum phase filter gives a maximum delay of M=32 samples, which can be seen in FIG. 23 by the slope from sample 160 to 192. The delay is minimal under the constrain that the gain function is causal.

Figure 24:
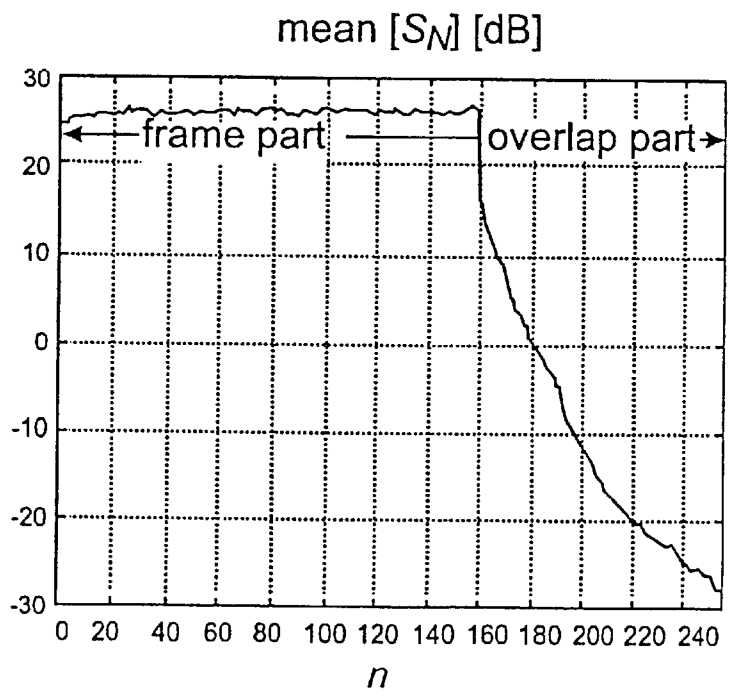

FIG. 24 presents the mean $|s_N|$ resulting from a gain function with an impulse response of the full length N, and is constrained to have minimum-phase. The constrain to minimum-phase gives a maximum delay of N=256 samples, and the block can hold a maximum linear delay of 96 samples since the frame is 160 samples at the beginning of the full block of 256 samples. This can be observed in the FIG. 24 by the slope from sample 160 to 255, which does not reach zero. Since the delay may be longer than 96, it results in a circular delay, and in the case of minimum-phase it is difficult to detect the delayed samples that overlay the frame part.

Figure 25:
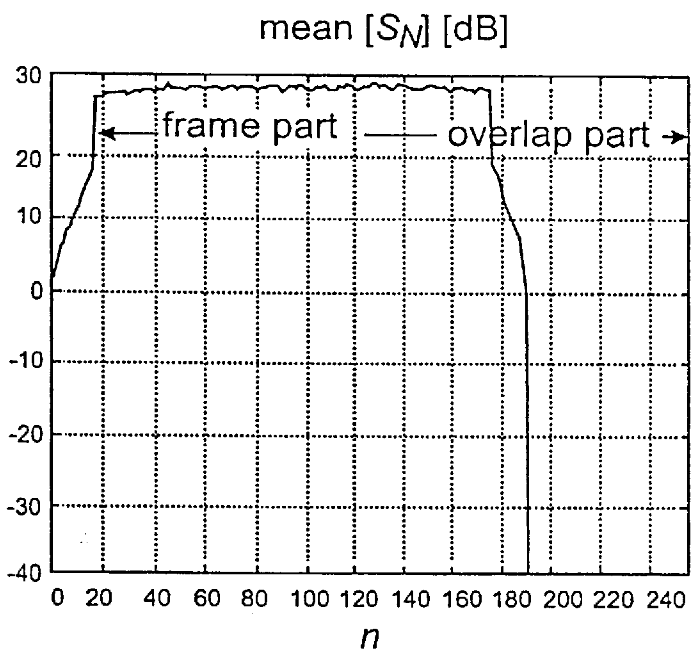

FIG. 25 presents the mean $|s_N|$ resulting form a linear-phase gain function with an impulse response of the shorter length M. The linear-phase applied to the gain function makes it causal. This can be observed by the low level in the samples at the end of the averaged block. The delay with the linear-phase gain function is M/2=16 samples as can be noticed by the slope from sample 0 to 15 and 160 to 175.

Figure 26:
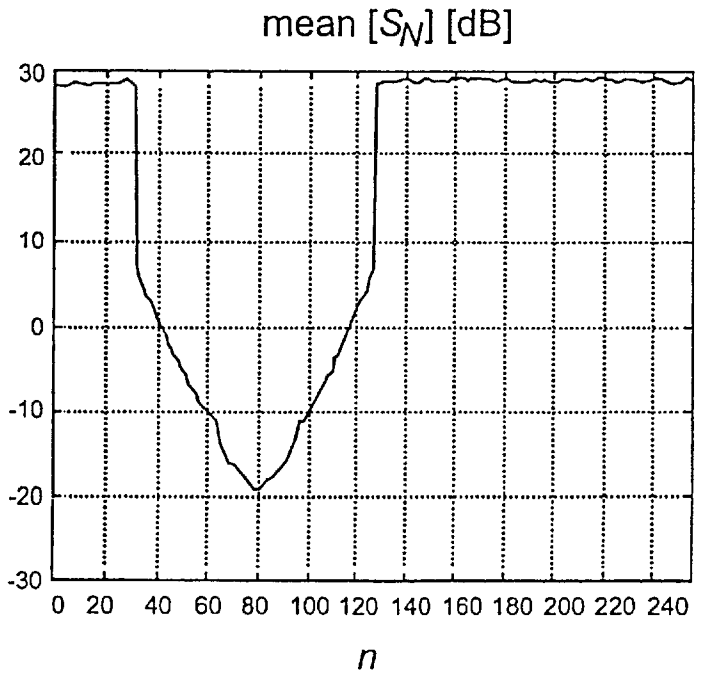

FIG. 26 presents the mean $|s_N|$ resulting from a gain function with an impulse response of the full length N, and is constrained to have linear-phase. The constrain to linear-phase gives a maximum delay of N/2=128 samples. The block can hold a maximum linear delay of 96 samples since the frame is 160 samples at the beginning of the full block of 256 samples. The samples that is delayed longer than 96 samples give rise to the circular delay observed.

The benefit of low sample values in the block corresponding to the overlap is less interference between blocks, since the overlap will not introduce discontinuities. When a full length impulse response is used, which is the case for conventional spectral subtraction, the delay introduced with linear-phase or minimum-phase exceeds the length of the block. The resulting circular delay gives a wrap around of the delayed samples, and hence the output samples can be in the wrong order. This indicates that when a linear-phase or minimum-phase gain function is used, the shorter length of the impulse response should be chosen. The introduction of the linear- or minimum-phase makes the gain function causal.

When the sound quality of the output signal is the most important factor, the linear phase filter should be used. When the delay is important, the non-causal zero phase filter should be used, although speech quality is lost compared to using the linear phase filter. A good compromise is the minimum phase filter, which has a short delay and good speech quality, although the complexity is higher compared to using the linear phase filter. The gain function corresponding to the impulse response of the short length M should always be used to gain sound quality.

Figure 27:
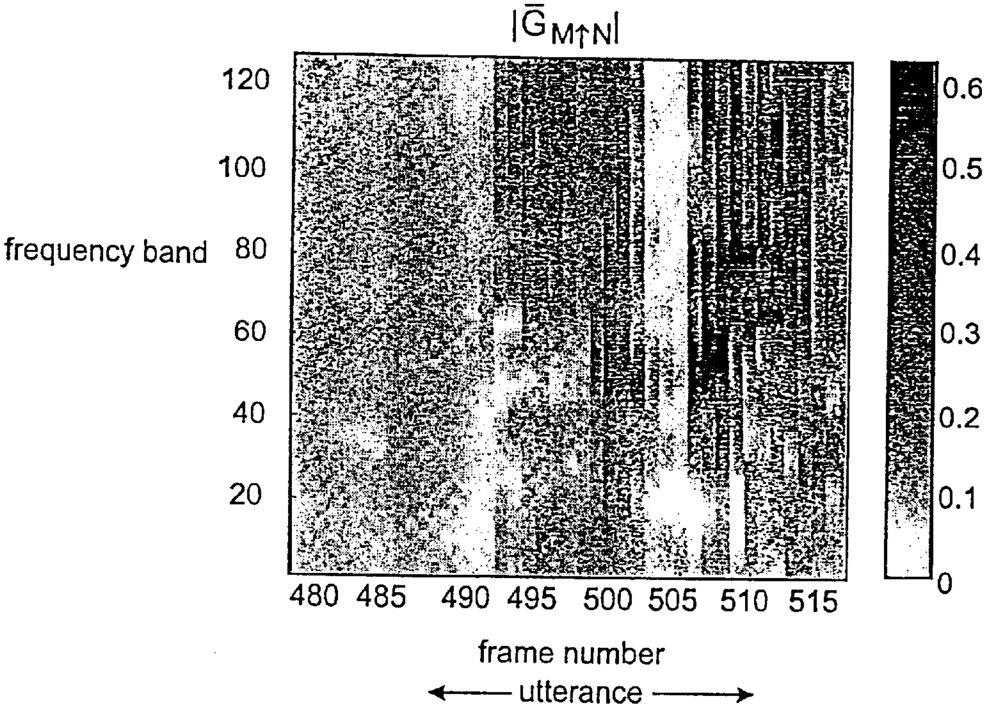
Figure 28:
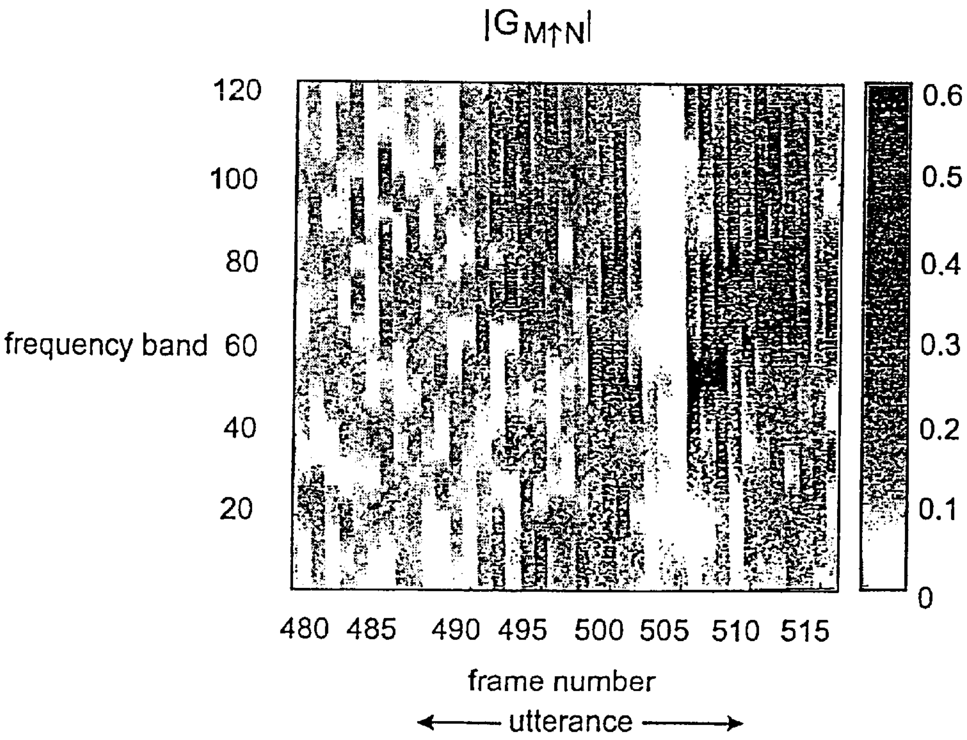

The exponential averaging of the gain function provides lower variance when the signal is stationary. The main advantage is the reduction of musical tones and residual noise. The gain function with and without exponential averaging is presented in FIGS. 27 and 28. As shown, the variability of the signal is lower during noise periods and also for low energy speech periods, when the exponential averaging is employed. The lower variability of the gain function results in less noticeable tonal artifacts in the output signal.

In sum, the present invention provides improved methods and apparatus for spectral subtraction using linear convolution, causal filtering and/or controlled exponential averaging of the gain function. The exemplary methods provide improved noise reduction and work well with frame lengths which are not necessarily a power of two. This can be an important property when the noise reduction method is integrated with other speech enhancement methods as well as speech coders.

The exemplary methods reduce the variability of the gain function, in this case a complex function, in two significant ways. First, the variance of the current blocks spectrum estimate is reduced with a spectrum estimation method (e.g., Bartlett or Welch) by trading frequency resolution with variance reduction. Second, an exponential averaging of the gain function is provided which is dependent on the discrepancy between the estimated noise spectrum and the current input signal spectrum estimate. The low variability of the gain function during stationary input signals gives an output with less tonal residual noise. The lower resolution of the gain function is also utilized to perform a correct convolution yielding an improved sound quality. The sound quality is further enhanced by adding causal properties to the gain function. Advantageously, the quality improvement can be observed in the output block. Sound quality improvement is due to the fact that the overlap part of the output blocks have much reduced sample values and hence the blocks interfere less when they are fitted with the overlap and add method. The output noise reduction is 13–18 dB using the exemplary parameter choices described above.

Those skilled in the art will appreciate that the present invention is not limited to the specific exemplary embodiments which have been described herein for purposes of illustration and that numerous alternative embodiments are also contemplated. For example, though the invention has been described in the context of hands-free communications applications, those skilled in the art will appreciate that the teachings of the invention are equally applicable in any signal processing application in which it is desirable to remove a particular signal component. The scope of the invention is therefore defined by the claims which are appended hereto, rather than the foregoing description, and all equivalents which are consistent with the meaning of the claims are intended to be embraced therein.

We claim:

1. A noise reduction system, comprising:

a spectral subtraction processor configured to filter a noisy input signal to provide a noise reduced output signal, wherein a gain function of the spectral subtraction processor is computed based on an estimate of a spectral density of the input signal and on an averaged estimate of a spectral density of a noise component of the input signal, wherein successive blocks of samples of the gain function are averaged; and, wherein the number of successive blocks of samples of the gain function in a memory of the averaging is adaptively changed.

2. The noise reduction system of claim 1, wherein successive blocks of the gain function are averaged based on a discrepancy between the estimate of the spectral density of the input signal and the averaged estimate of the spectral density of the noise component of the input signal.

3. The noise reduction system of claim 2, wherein a memory of the averaging is inversely proportional to the discrepancy.

4. The noise reduction system of claim 2, wherein a memory of the averaging is made to increase in direct proportion with decreases in the discrepancy and made to exponentially decay with increases in the discrepancy.

5. The noise reduction system of claim 2, wherein said memory of the averaging is adaptively changed according to the discrepancy.

6. The noise reduction system of claim 1, wherein successive blocks of samples of the gain function are averaged using exponential averaging.

7. The noise reduction system of claim 1, wherein the gain function averaging varies over time.

8. A method for processing a noisy input signal to provide a noise reduced output signal, comprising the steps of:

computing an estimate of a spectral density of the input signal and an averaged estimate of a spectral density of a noise component of the input signal;

using spectral subtraction to compute the noise reduced output signal based on the noisy input signal, averaging successive blocks of a gain function used in said step of using spectral subtraction, to compute the noise reduced output signal; and, wherein the number of successive blocks of the gain function in a memory of the averaging is adaptively changed.

9. The method of claim 8, comprising the step of averaging successive blocks of the gain function based on a discrepancy between the estimate of the spectral density of the input signal and the averaged estimate of the spectral density of the noise component of the input signal.

10. The method of claim 9, wherein a memory of the averaging of successive blocks of the gain function is inversely proportional to the discrepancy.

11. The method of claim 9, wherein a memory of the averaging of successive blocks is made to increase in direct proportion with decreases in the discrepancy and made to exponentially decay with increases in the discrepancy.

12. The method of claim 9, wherein said memory of the averaging is adaptively changed according to the discrepancy.

13. The method of claim 8, comprising the step of averaging successive blocks of samples of the gain function using exponential averaging.

14. The method of claim 8, wherein the gain function averaging varies over time.

15. A mobile telephone, comprising:

a spectral subtraction processor configured to filter a noisy near-end speech signal to provide a noise reduced near-end speech signal, wherein a gain function of the spectral subtraction processor is computed based on an estimate of a spectral density of the noisy near-end speech signal and on an averaged estimate of a spectral density of a noise component of the noisy near-end speech signal, wherein successive blocks of samples of the gain function are averaged; and, wherein the number of successive blocks of samples of the gain function in a memory of the averaging is adaptively changed.

16. The mobile telephone of claim 15, wherein successive blocks of the gain function are averaged based on a discrepancy between the estimate of the spectral density of the noisy near-end speech signal and the averaged estimate of the spectral density of the noise component of the noisy near-end speech signal.

17. The mobile telephone of claim 16, wherein a memory of the averaging is inversely proportional to the discrepancy.

18. he mobile telephone of claim 16, wherein a memory of the averaging is made to increase in direct proportion with decreases in the discrepancy and made to exponentially decay with increases in the discrepancy.

19. The mobile telephone of claim 16, said memory of the averaging is adaptively changed according to the discrepancy.

20. The mobile telephone of claim 15, wherein successive blocks of samples of the gain function are averaged using exponential averaging.

21. The mobile telephone of claim 15, wherein the gain function averaging varies over time.

* * * * *